US012356374B2

(12) United States Patent
Hu et al.

(10) Patent No.: US 12,356,374 B2
(45) Date of Patent: Jul. 8, 2025

(54) COMMUNICATION METHOD, APPARATUS, DEVICE, AND SYSTEM, AND STORAGE MEDIUM FOR AVOIDING UPLINK TRANSMISSION INTERFERENCE

(71) Applicant: Huawei Technologies Co., Ltd., Shenzhen (CN)

(72) Inventors: Dan Hu, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 703 days.

(21) Appl. No.: 17/213,812

(22) Filed: Mar. 26, 2021

(65) Prior Publication Data

US 2021/0219278 A1 Jul. 15, 2021

Related U.S. Application Data

(63) Continuation of application No. PCT/CN2019/108482, filed on Sep. 27, 2019.

(30) Foreign Application Priority Data

Sep. 28, 2018 (CN) .......................... 201811142342.1
Jan. 11, 2019 (CN) .......................... 201910026492.4

(51) Int. Cl.
*H04W 72/044* (2023.01)
*H04L 5/00* (2006.01)

(52) U.S. Cl.
CPC ......... *H04W 72/044* (2013.01); *H04L 5/0048* (2013.01)

(58) Field of Classification Search
CPC ............... H04W 72/044; H04W 72/23; H04W 72/1268; H04W 72/0446; H04W 72/0453; H04W 72/21; H04L 5/0048; H04L 5/0094
See application file for complete search history.

(56) References Cited

U.S. PATENT DOCUMENTS

| 2015/0036601 | A1 | 2/2015 | Kim et al. |
| 2015/0195063 | A1 | 7/2015 | Ro et al. |
| 2016/0095104 | A1 | 3/2016 | Chen et al. |

(Continued)

FOREIGN PATENT DOCUMENTS

| CN | 107295674 A | 10/2017 |
| CN | 108347318 A | 7/2018 |

(Continued)

OTHER PUBLICATIONS

Qualcomm Incorporated, R1-1804820, 3GPP TSG-RAN WG1 #92b, Sanya, China, Apr. 2018 (Year: 2018).*

(Continued)

*Primary Examiner* — Gary Mui
*Assistant Examiner* — Yewon Kim
(74) *Attorney, Agent, or Firm* — Slater Matsil, LLP

(57) ABSTRACT

This application provides a communication method, and apparatus. The communication method includes: a terminal device receives indication information from a network device, wherein the indication information indicates a first time-frequency resource, the terminal device adjusts sending of a sounding reference signal (SRS) in a second time-frequency resource based on the indication information.

18 Claims, 14 Drawing Sheets

(56) References Cited

U.S. PATENT DOCUMENTS

| | | | |
|---|---|---|---|
| 2017/0366377 A1 | 12/2017 | Papasakellariou | |
| 2018/0035459 A1 | 2/2018 | Islam et al. | |
| 2018/0199334 A1 | 7/2018 | Ying et al. | |
| 2018/0278454 A1 | 9/2018 | Islam et al. | |
| 2019/0320450 A1 | 10/2019 | Li et al. | |
| 2019/0327755 A1* | 10/2019 | Xiong | H04L 5/0046 |

FOREIGN PATENT DOCUMENTS

| | | |
|---|---|---|
| CN | 108430106 A | 8/2018 |
| WO | 2017215642 A1 | 12/2017 |
| WO | 2018000712 A1 | 1/2018 |
| WO | 2018082060 A1 | 5/2018 |
| WO | 2018128401 A1 | 7/2018 |
| WO | 2018137150 A1 | 8/2018 |

OTHER PUBLICATIONS

Fujitsu, R1-1719616, 3GPP TSG RAN WG1 Meeting #91, Reno, USA, Nov.-Dec. 2017 (Year: 2017).*

MediaTek Inc., R1-1801674, 3GPP TSG RAN WG1 Meeting #92, Athens, Greece, Feb.-Mar. 2018 (Year: 2018).*

Vivo, R1-1805629, 3GPP TSG RAN WG1 Meeting #92bis, Sanya, China, Apr. 2018 (Year: 2018).*

LG Electronics, R1-1804572, 3GPP TSG RAN WG1 Meeting #92, Athens, Greece, Feb.-Mar. 2018 (Year: 2018).*

Intel Corporation, "Uplink multiplexing of eMBB/URLLC transmissions", 3GPP TSG RAN1 WG Meeting #88, R1-1702241, Feb. 13-17, 2017, 8 pages, Athens, Greece.

Nokia et al., "Pause-Resume Scheduling for Low Latency Uplink Transmissions", 3GPP TSG-RAN WG1 NR AH, R1-1701024, Jan. 16-20, 2017, 5 pages, Spokane, WA, USA.

Lenovo et al., "On eMBB/URLLC multiplexing for uplink transmission", 3GPP TSG RAN WG1 NR Ad-Hoc#2, R1-1710606, Jun. 27-30, 2017, 4 pages, Qingdao, P.R. China.

Nokia et al., "On UL inter-UE multiplexing between eMBB and URLLC", 3GPP TSG-RAN WG1 Meeting #94, R1-1808569, Aug. 20-24, 2018, 5 pages, Gothenburg, Sweden.

LG Electronics, "Remaining issues on UL data transmission procedure", 3GPP TSG RAN WG1 Meeting #92, R1-1802215, Feb. 26-Mar. 2, 2018, 13 pages, Athens, Greece.

LG Electronics, "Discussion on UL inter UE Tx prioritization", 3GPP TSG RAN WG1 meeting #94, R1-1808532, Aug. 20-24, 2018, 6 pages, Gothenburg, Sweden.

Samsung, "Multiplexing of UL Transmissions with Different Reliability Requirements", 3GPP TSG RAN WG1 Meeting #92, R1-1802002, Feb. 26-Mar. 2, 2018, 7 pages, Athens, Greece.

Nokia, Nokia Shanghai Bell, On UL inter-UE multiplexing between eMBB and URLLC. 3GPP TSG-RAN WG1 Meeting #94, R1-1808569, Aug. 20-24, 2018, 5 pages, Gothenburg, Sweden.

LG Electronics, Discussion on multiplexing UL transmission with different requirements. 3GPP TSG RAN WG1 Meeting #92, R1-1802228, Feb. 26-Mar. 2, 2018, 6 pages, Athens, Greece.

3GPP TS 38.213 V15.2.0 (Jun. 2018), 3rd Generation Partnership Project; Technical Specification Group Radio Access Network; NR; Physical layer procedures for control (Release 15), 99 pages.

3GPP TS 38.212 V15.3.0 (Sep. 2018), 3rd Generation Partnership Project; Technical Specification Group Radio Access Network; NR; Multiplexing and channel coding(Release 15), 99 pages.

* cited by examiner

COMMUNICATION METHOD, APPARATUS, DEVICE, AND SYSTEM, AND STORAGE MEDIUM FOR AVOIDING UPLINK TRANSMISSION INTERFERENCE

CROSS-REFERENCE TO RELATED APPLICATIONS

This application is a continuation of International Patent Application No. PCT/CN2019/108482, filed on Sep. 27, 2019, which claims priority to Chinese Patent Application No. 201811142342.1, filed on Sep. 28, 2018, and Chinese Patent Application No. 201910026492.4, filed on Jan. 11, 2019. The disclosures of the aforementioned applications are hereby incorporated by reference in their entireties.

TECHNICAL FIELD

This application relates to the field of communications technologies, and in particular, to a communication method, apparatus, device, and system, and a storage medium.

BACKGROUND

To cope with future explosive growth of mobile data traffic, massive connections of mobile communications devices, and continuously emerging new services and application scenarios, a new mobile communications system emerges. The international telecommunication union (ITU) defines three main types of application scenarios for a future mobile communications system: enhanced mobile broadband (eMBB), ultra-reliable low-latency communication (ultra-reliable and low-latency communications, URLLC), and massive machine-type communications (massive machine type communications, mMTC).

In uplink transmission, a base station schedules a time-frequency resource for an eMBB terminal device, and the eMBB terminal device performs uplink transmission on the time-frequency resource. In a transmission process of eMBB data of the eMBB terminal device, when burst URLLC data needs to be transmitted, a URLLC terminal device first sends a scheduling request (SR) to the base station, and the base station allocates a time-frequency resource to the URLLC terminal device.

However, when the base station allocates the time-frequency resource to the URLLC terminal device, uplink transmission interference may be caused to the eMBB terminal device served by the base station. Consequently, uplink transmission efficiency of the communications system is reduced.

SUMMARY

Embodiments of this application provide a communication method, apparatus, device, and system, and a storage medium, to avoid uplink transmission interference and improve uplink transmission efficiency of a communications system.

According to a first aspect, an embodiment of this application provides a communication method, applied to a terminal device. The method may include: receiving indication information from a network device, where the indication information is used to indicate a first time-frequency resource; and adjusting sending of N uplink channels when the first time-frequency resource overlaps with a second time-frequency resource carrying the N uplink channels to be sent by the terminal device, where N is a positive integer.

In this way, interference, caused by information carried on the second time-frequency resource, to information carried on the first time-frequency resource can be avoided, accurate transmission of information on the first time-frequency resource can be ensured, and uplink transmission efficiency of a communications system can be improved.

N may be equal to 1, or may be a positive integer greater than or equal to 2.

In a first example, when N is equal to 1, that the terminal device adjusts sending of the N uplink channels when the first time-frequency resource overlaps with the second time-frequency resource carrying the N uplink channels to be sent by the terminal device may include: The terminal device adjusts sending of the uplink channel when a part of the second time-frequency resource overlaps with the first time-frequency resource and a remaining part of the second time-frequency resource does not overlap with the first time-frequency resource.

In a second example, when N is greater than or equal to 2, the second time-frequency resource may include N time units, each time unit carries one of the uplink channels, the uplink channels carry same information, M time units in the N time units overlap with the first time-frequency resource, and Q time units other than the M time units in the N time units do not overlap with the first time-frequency resource, where M and Q are both positive integers less than or equal to N, and N is a sum of M and Q.

In the first example and the second example, that the terminal device adjusts sending of the N uplink channels may be that the terminal device discards the N uplink channels carried on the second time-frequency resource. That is, the terminal device does not send the N uplink channels carried on the second time-frequency resource. In this way, interference, caused by information carried on the second time-frequency resource, to information carried on the first time-frequency resource can be completely avoided.

Optionally, in the second example, that the terminal device adjusts sending of the N uplink channels may be discarding some uplink channels and sending some uplink channels. In this case, there are two cases based on different scheduling manners of the uplink channels.

In a first case, when the uplink channels are grant-based uplink channels, that the terminal device adjusts sending of the uplink channels may include: discarding uplink channels carried in the M time units, and sending uplink channel carried in the Q time units.

In the first case, P uplink channels in the N uplink channels may share one DMRS, and P is a positive integer less than or equal to Q. In this case, the method in this embodiment of this application may further include: When time units carrying R uplink channels in the P uplink channels belong to the Q time units, and time units carrying the DMRS belong to the M time units, the terminal device determines that the R uplink channels share the first DMRS carried in the Q time units, where R is a positive integer less than P.

In a second case, when the uplink channels are configured grant uplink channels, that the terminal device adjusts sending of the uplink channels may include: determining, in the Q time units, a target time unit that is the first time unit carrying a DMRS; discarding an uplink channel carried in a time unit that is before the target time unit and that is in the N time units; and sending an uplink channel carried in the target time unit and an uplink channel carried in a time unit that is after the target time unit and that is in the N time units.

That is, in the technical solution in this embodiment of this application, when the uplink channels are grant-based uplink channels, the terminal device discards the uplink channels carried in the M time units, and sends the uplink channels carried in the Q time units. When the uplink channels are configured grant uplink channels, the terminal device first determines, in the Q time units, the target time unit that is the first time unit carrying the DMRS; discards the uplink channel carried in the time unit that is before the target time unit and that is in the N time units; and sends the uplink channel carried in the target time unit and the uplink channel carried in the time unit that is after the target time unit and that is in the N time units. In this way, at least one uplink channel carried on the second time-frequency resource is transmitted while uplink information carried on the first time-frequency resource is accurately sent, so that uplink transmission reliability and transmission efficiency of the communications system are improved.

Optionally, that the terminal device adjusts sending of the N uplink channels may alternatively be that the terminal device temporarily skips sending the uplink channels carried on the second time-frequency resource, and after sending of uplink information carried on the first time-frequency resource ends, sends the N uplink channels carried on the second time-frequency resource. Alternatively, when the uplink channels are grant-based uplink channels, the terminal device temporarily skips sending uplink channels carried in the M time units, sends uplink channels carried in the Q time units, and after sending of uplink information carried on the first time-frequency resource ends, sends the uplink channels carried in the M time units. Alternatively, when the uplink channels are configured grant uplink channels, the terminal device temporarily skips sending an uplink channel carried in a time unit that is before a target time unit and that is in the N time units, and sends an uplink channel carried in the target time unit and an uplink channel carried in a time unit that is after the target time unit and that is in the N time units; and after sending of uplink information carried on the first time-frequency resource ends, sends the uplink channel carried in the time unit that is before the target time unit and that is in the N time units. In this way, reliable transmission of the uplink channels carried on the second time-frequency resource can be ensured while the uplink information carried on the first time-frequency resource is accurately sent.

In a the third example, if the N uplink channels are uplink control channels (PUCCH) with format 0, when a part of the second time-frequency resource overlaps with the first time-frequency resource and a remaining part of the second time-frequency resource does not overlap with the first time-frequency resource, that the terminal device adjusts sending of the N uplink channels may include: sending information carried on the N uplink channels on the time-frequency resource that is in the second time-frequency resource and that does not overlap with the first time-frequency resource in time domain, and canceling sending, of information, on the time-frequency resource that is in the second time-frequency resource and that overlaps with the first time-frequency resource in time domain, where the canceling may be understood as giving up. In the third case, information carried on different symbols of a same PUCCH with format 0 is the same. Therefore, information carried on the N uplink channels is sent on the time-frequency resource that is in the second time-frequency resource and that does not overlap with the first time-frequency resource in time domain, so that repeated sending of the PUCCH with format 0 can be avoided, and communication resources are saved.

In an example, if N is 1, that is, one PUCCH with format 0 is carried on the second time-frequency resource, and the PUCCH occupies two symbols of the second time-frequency resource in frequency domain: a first symbol and a second symbol, where the first symbol overlaps with the first time-frequency resource in time domain, and the second symbol does not overlap with the first time domain resource in time domain, the terminal device may send information carried on the second symbol, but may not send information carried on the first symbol. Because the information carried on the first symbol is the same as the information carried on the second symbol, after the information carried on the second symbol is sent, the PUCCH is not re-transmitted. Therefore, repeated sending of the PUCCH is avoided, and communication resources are saved.

In an implementation, that the terminal device adjusts sending of the N uplink channels includes: The terminal device adjusts sending of the N uplink channels when a first time interval is less than a second time interval. The first time interval is a time required by the terminal device to process the indication information sent by the network device. The second time interval is a time interval between a time at which the terminal device receives the indication information and a time at which the terminal device starts to send the N uplink channels.

According to a second aspect, an embodiment of this application provides a communication method, applied to a network device. The method includes: The network device sends indication information to a terminal device. The indication information is used to indicate a first time-frequency resource. When the first time-frequency resource overlaps with a second time-frequency resource carrying N uplink channels to be sent by the terminal device, the network device receives at least one uplink channel carried on a time-frequency resource that is in the second time-frequency resource and that does not overlap with the first time-frequency resource from the terminal device. N is a positive integer greater than or equal to 2.

Optionally, the second time-frequency resource may include N time units, each time unit carries one of the uplink channels, the uplink channels carry same information, M time units in the N time units overlap with the first time-frequency resource, and Q time units other than the M time units in the N time units do not overlap with the first time-frequency resource, where M and Q are both positive integers less than or equal to N, and N is a sum of M and Q.

Because scheduling manners of uplink channels are different, uplink channels sent by the terminal device are different. Correspondingly, uplink channels received by the network device are also different.

In a first example, when the uplink channels are grant-based uplink channels, that the network device receives at least one uplink channel carried on a time-frequency resource that is in the second time-frequency resource and that does not overlap with the first time-frequency resource from the terminal device may include: The network device receives uplink channels carried in the Q time units.

In the first example, P uplink channels in the N uplink channels may share one demodulation reference signal DMRS, and P is a positive integer less than or equal to Q. In this case, the method in this embodiment of this application may further include: When time units carrying R uplink channels in the P uplink channels belong to the Q time units, and time units carrying the DMRS belong to the M time units, the network device determines that the R uplink channels share the first DMRS carried in the Q time units, where R is a positive integer less than P.

In a second example, when the uplink channels are configured grant uplink channels, that the network device receives at least one uplink channel carried on a time-frequency resource that is in the second time-frequency resource and that does not overlap with the first time-frequency resource from the terminal device may include: The network device receives an uplink channel carried in a target time unit and an uplink channel carried in a time unit that is after the target time unit and that is in the N time units, where the target time unit is the first time unit carrying a DMRS in the Q time units.

Optionally, in this embodiment of this application, when a quantity of uplink channels carried on the time-frequency resource that is in the second time-frequency resource and that does not overlap with the first time-frequency resource is less than P, the N uplink channels carried on the second time-frequency resource are discarded.

Optionally, the time unit in this embodiment of this application is a mini-slot, and a quantity of symbols included in the mini-slot is less than 14.

Optionally, the first time-frequency resource in this embodiment of this application is used for uplink transmission of another terminal device.

In an implementation, when a part of the second time-frequency resource overlaps with the first time-frequency resource and a remaining part of the second time-frequency resource does not overlap with the first time-frequency resource, the method in this embodiment of this application further includes: receiving information carried on the N uplink channels on the time-frequency resource that is in the second time-frequency resource and that does not overlap with the first time-frequency resource in time domain, where N is a positive integer greater than or equal to 1, and the N uplink channels are uplink control channels with format 0.

According to a third aspect, an embodiment of this application provides a communications apparatus, applied to a terminal device. The apparatus includes a receiving unit and an adjustment unit. The receiving unit is configured to receive indication information from a network device. The indication information is used to indicate a first time-frequency resource. The adjustment unit is configured to adjust sending of N uplink channels when the first time-frequency resource overlaps with a second time-frequency resource carrying the N uplink channels to be sent by the terminal device, where N is a positive integer.

In a first example, when N is equal to 1, the adjustment unit is specifically configured to adjust sending of the uplink channel when a part of the second time-frequency resource overlaps with the first time-frequency resource and a remaining part of the second time-frequency resource does not overlap with the first time-frequency resource.

In a second example, when N is greater than or equal to 2, the second time-frequency resource includes N time units, each time unit carries one of the uplink channels, the uplink channels carry same information, M time units in the N time units overlap with the first time-frequency resource, and Q time units other than the M time units in the N time units do not overlap with the first time-frequency resource, where M and Q are both positive integers less than or equal to N, and N is a sum of M and Q.

Based on the first example and the second example, the adjustment unit may be specifically configured to discard the N uplink channels carried on the second time-frequency resource.

In the second example, the adjustment unit may adjust sending of the uplink channels in two cases based on different scheduling manners of the uplink channels.

In a first case, the uplink channels are grant-based uplink channels. The adjustment unit is specifically configured to discard uplink channels carried in the M time units, and send uplink channels carried in the Q time units.

In the first case, P uplink channels in the N uplink channels share one demodulation reference signal DMRS, and P is a positive integer less than or equal to Q. In this case, the apparatus in this embodiment may further include a determining unit. The determining unit is configured to: when time units carrying R uplink channels in the P uplink channels belong to the Q time units, and time units carrying the DMRS belong to the M time units, determine that the R uplink channels share the first DMRS carried in the Q time units, where R is a positive integer less than P.

In a second case, the uplink channels are configured grant uplink channels. The adjustment unit is specifically configured to: determine, in the Q time units, a target time unit that is the first time unit carrying a DMRS; discard an uplink channel carried in a time unit that is before the target time unit and that is in the N time units; and send an uplink channel carried in the target time unit and an uplink channel carried in a time unit that is after the target time unit and that is in the N time units.

Optionally, the adjustment unit is further configured to temporarily skip sending the uplink channels carried on the second time-frequency resource, and after sending of uplink information carried on the first time-frequency resource ends, send the N uplink channels carried on the second time-frequency resource. Alternatively, when the uplink channels are grant-based uplink channels, the adjustment unit is further configured to: temporarily skip sending uplink channels carried in the M time units, send uplink channels carried in the Q time units, and after sending of uplink information carried on the first time-frequency resource ends, send the uplink channels carried in the M time units. Alternatively, when the uplink channels are configured grant uplink channels, the adjustment unit is further configured to: temporarily skip sending an uplink channel carried in a time unit that is before the target time unit and that is in the N time units, and send an uplink channel carried in the target time unit and an uplink channel carried in a time unit that is after the target time unit and that is in the N time units; and after sending of uplink information carried on the first time-frequency resource ends, send the uplink channel carried in the time unit that is before the target time unit and that is in the N time units.

In a third example, if the N uplink channels are PUCCHs with format 0, and when a part of the second time-frequency resource overlaps with the first time-frequency resource and a remaining part of the second time-frequency resource does not overlap with the first time-frequency resource, the adjustment unit is further configured to: send information carried on the N uplink channels on the time-frequency resource that is in the second time-frequency resource and that does not overlap with the first time-frequency resource in time domain, and cancel sending, of information, on the time-frequency resource that is in the second time-frequency resource and that overlaps with the first time-frequency resource in time domain.

In an example, if N is 1, that is, one PUCCH with format 0 is carried on the second time-frequency resource, and the PUCCH occupies two symbols of the second time-frequency resource in time domain: a first symbol and a second symbol, where the first symbol overlaps with the first time-frequency resource in time domain, and the second symbol does not overlap with the first time domain resource in time domain, the adjustment unit is specifically configured to: send information carried on the second symbol, and skip sending information carried on the first symbol.

Optionally, the adjustment unit is further configured to: adjust sending of the N uplink channels when a first time interval is less than a second time interval, where the first time interval is a time required by the terminal device to process the indication information sent by the network device, and the second time interval is a time interval between a time at which the terminal device receives the indication information and a time at which the terminal device starts to send the N uplink channels.

According to a fourth aspect, an embodiment of this application provides a communications apparatus, applied to a network device. The apparatus includes a sending unit and a receiving unit. The sending unit is configured to send indication information to a terminal device. The indication information is used to indicate a first time-frequency resource. The receiving unit is configured to: when the first time-frequency resource overlaps with a second time-frequency resource carrying N uplink channels to be sent by the terminal device, receive at least one uplink channel carried on a time-frequency resource that is in the second time-frequency resource and that does not overlap with the first time-frequency resource from the terminal device. N is a positive integer greater than or equal to 2.

Optionally, the second time-frequency resource includes N time units, each time unit carries one of the uplink channels, the uplink channels carry same information, M time units in the N time units overlap with the first time-frequency resource, and Q time units other than the M time units in the N time units do not overlap with the first time-frequency resource, where M and Q are both positive integers less than or equal to N, and N is a sum of M and Q.

In a first example, when the uplink channels are grant-based uplink channels, the receiving unit is specifically configured to receive uplink channels carried in the Q time units.

In the first example, P uplink channels in the N uplink channels may share one demodulation reference signal DMRS, and P is a positive integer less than or equal to Q. In this case, the apparatus in this embodiment of this application may further include a determining unit. The determining unit is configured to: when time units carrying R uplink channels in the P uplink channels belong to the Q time units, and time units carrying the DMRS belong to the M time units, determine that the R uplink channels share the first DMRS carried in the Q time units, where R is a positive integer less than P.

In a second example, when the uplink channels are configured grant uplink channels, the receiving unit is configured to: receive an uplink channel carried in a target time unit and an uplink channel carried in a time unit that is after the target time unit and that is in the N time units, where the target time unit is the first time unit carrying a DMRS in the Q time units.

In an implementation, when a part of the second time-frequency resource overlaps with the first time-frequency resource and a remaining part of the second time-frequency resource does not overlap with the first time-frequency resource, the receiving unit is further configured to receive information carried on the N uplink channels on the time-frequency resource that is in the second time-frequency resource and that does not overlap with the first time-frequency resource in time domain, where N is a positive integer greater than or equal to 1.

According to a fifth aspect, an embodiment of this application provides a communication method. The method is applied to a terminal device. A difference between this method and the method according to the first aspect lies in that, N uplink signals to be sent by the terminal device are carried on a second time-frequency resource in this method. The method includes:

The terminal device receives indication information from a network device. The indication information is used to indicate a first time-frequency resource. Then, when a part of the second time-frequency resource overlaps with the first time-frequency resource and a remaining part of the second time-frequency resource does not overlap with the first time-frequency resource, the terminal device sends the N uplink signals on the time-frequency resource that is in the second time-frequency resource and that does not overlap with the first time-frequency resource in time domain, and cancels sending, of a signal, on the time-frequency resource that is in the second time-frequency resource and that overlaps with the first time-frequency resource in time domain.

It should be noted that the N uplink signals are the same, each uplink signal occupies a plurality of symbols of the second time-frequency resource in time domain, and information carried on the symbols is the same. Therefore, the N uplink signals are sent on the time-frequency resource that is in the second time-frequency resource and that does not overlap with the first time-frequency resource in time domain, so that repeated sending of the uplink signals can be avoided, and communication resources are saved.

In an example, if N is 1, that is, one uplink signal is carried on the second time-frequency resource, for example, one sounding reference signal (SRS) is carried, the uplink signal occupies a plurality of symbols of the second time-frequency resource in frequency domain, a first part of symbols in the plurality of symbols overlap with the first time-frequency resource in time domain, and a second part of symbols different from the first part of symbols in the plurality of symbols do not overlap with the first time domain resource in time domain. In this case, the terminal device may send a signal on the second part of symbols, but may not send a signal on the first part of symbols. Because all of the plurality of symbols carry the same signal, after the signal carried on the second part of symbols is sent, the uplink signal does not need to be re-transmitted. Therefore, repeated sending of the uplink signal is avoided, and communication resources are saved.

Optionally, when the terminal device sends the N uplink signals, a processing delay requirement needs to be met. Specifically, the terminal device adjusts sending of the N uplink signals when a third time interval is less than a fourth time interval. The third time interval is a time required by the terminal device to process the indication information sent by the network device. The fourth time interval is a time interval between a time at which the terminal device receives the indication information and a time at which the terminal device starts to send the N uplink signals.

According to a sixth aspect, an embodiment of this application provides a communication method. The method is applied to a network device. A difference between this method and the method according to the second aspect lies in that, N uplink signals to be sent by a terminal device are carried on a second time-frequency resource in this method. The method includes:

The network device sends indication information to the terminal device. The indication information is used to indicate a first time-frequency resource. Then, when a part of the second time-frequency resource overlaps with the first time-frequency resource and a remaining part of the second time-frequency resource does not overlap with the first time-frequency resource, the network device receives the N uplink signals on the time-frequency resource that is in the second time-frequency resource and that does not overlap with the first time-frequency resource in time domain.

It should be noted that the N uplink signals are the same, each uplink signal occupies a plurality of symbols of the second time-frequency resource in time domain, and information carried on the symbols is the same.

In an example, if N is 1, that is, one uplink signal is carried on the second time-frequency resource, for example, one SRS is carried, the uplink signal occupies a plurality of symbols of the second time-frequency resource in time domain, a first part of symbols in the plurality of symbols overlap with the first time-frequency resource in time domain, and a second part of symbols different from the first part of symbols in the plurality of symbols do not overlap with the first time domain resource in time domain. In this case, the network device receives information carried on the second part of symbols.

According to a seventh aspect, an embodiment of this application provides a communications apparatus. The apparatus is applied to a terminal device. The apparatus is configured to implement the communication method according to the fifth aspect. The apparatus includes:

a receiving unit, configured to receive indication information from a network device, where the indication information is used to indicate a first time-frequency resource; and an adjustment unit, configured to: when a part of the second time-frequency resource overlaps with the first time-frequency resource and a remaining part of the second time-frequency resource does not overlap with the first time-frequency resource, send N uplink signals on the time-frequency resource that is in the second time-frequency resource and that does not overlap with the first time-frequency resource in time domain, and cancel sending, of a signal, on the time-frequency resource that is in the second time-frequency resource and that overlaps with the first time-frequency resource in time domain, where the N uplink signals to be sent by the terminal device are carried on the second time-frequency resource.

It should be noted that the N uplink signals are the same, each uplink signal occupies a plurality of symbols of the second time-frequency resource in time domain, and information carried on the symbols is the same.

In an example, if N is 1, that is, one uplink signal is carried on the second time-frequency resource, the uplink signal occupies the plurality of symbols of the second time-frequency resource in frequency domain, a first part of symbols in the plurality of symbols overlap with the first time-frequency resource in time domain, and a second part of symbols different from the first part of symbols in the plurality of symbols do not overlap with the first time domain resource in time domain.

In this case, the adjustment unit is specifically configured to send a signal carried on the second part of symbols, and skip sending a signal carried on the first part of symbols.

Optionally, the adjustment unit is further configured to: adjust sending of the N uplink signals when a third time interval is less than a fourth time interval, where the third time interval is a time required by the terminal device to process the indication information sent by the network device, and the fourth time interval is a time interval between a time at which the terminal device receives the indication information and a time at which the terminal device starts to send the N uplink signals.

According to an eighth aspect, an embodiment of this application provides a communications apparatus. The apparatus is applied to a network device, and is configured to implement the communication method according to the sixth aspect. The apparatus includes: a sending unit, configured to send indication information to a terminal device, where the indication information is used to indicate a first time-frequency resource; and a receiving unit, configured to: when a part of the second time-frequency resource overlaps with the first time-frequency resource and a remaining part of the second time-frequency resource does not overlap with the first time-frequency resource, receive N uplink signals on the time-frequency resource that is in the second time-frequency resource and that does not overlap with the first time-frequency resource in time domain, where the N uplink signals to be sent by the terminal device are carried on the second time-frequency resource.

It should be noted that the N uplink signals are the same, each uplink signal occupies a plurality of symbols of the second time-frequency resource in time domain, and information carried on the symbols is the same.

In an example, if N is 1, that is, one uplink signal is carried on the second time-frequency resource, for example, one SRS is carried, the uplink signal occupies a plurality of symbols of the second time-frequency resource in frequency domain, a first part of symbols in the plurality of symbols overlap with the first time-frequency resource in time domain, and a second part of symbols different from the first part of symbols in the plurality of symbols do not overlap with the first time domain resource in time domain. In this case, the receiving unit is specifically configured to receive a signal carried on the second part of symbols.

According to a ninth aspect, an embodiment of this application provides a communications device. The communications device includes a processor and a transceiver. The processor and the transceiver are configured to perform the communication method according to any one of the first aspect, the second aspect, the fifth aspect, and the sixth aspect.

According to a tenth aspect, an embodiment of this application provides an apparatus. The apparatus exists in a product form of a chip. A structure of the apparatus includes a processor and a memory. The memory is configured to couple to the processor, and store a program instruction and data that are necessary for the apparatus. The processor is configured to execute the program instruction stored in the memory, so that the apparatus performs functions of the terminal device in the foregoing methods.

According to an eleventh aspect, an embodiment of this application provides a terminal device. The terminal device may implement functions performed by the terminal device in the foregoing method embodiments. The functions may be implemented by hardware, or may be implemented by hardware by executing corresponding software. The hardware or software includes one or more modules or units corresponding to the foregoing functions.

In a possible design, a structure of the terminal device includes a processor and a transceiver. The processor is configured to support the terminal device in performing corresponding functions in the foregoing methods. The transceiver is configured to support communication between the terminal device and another terminal device or a network device. The terminal device may further include a memory. The memory is configured to couple to the processor, and the memory stores a program instruction and data that are necessary for the terminal device.

According to a twelfth aspect, an embodiment of this application provides an apparatus. The apparatus exists in a product form of a chip. A structure of the apparatus includes a processor and a memory. The memory is configured to couple to the processor, and store a program instruction and data that are necessary for the apparatus. The processor is configured to execute the program instruction stored in the memory, so that the apparatus performs functions of the network device in the foregoing methods.

According to a thirteenth aspect, an embodiment of this application provides a network device. The network device may implement functions performed by the network device in the foregoing method embodiments. The functions may be implemented by hardware, or may be implemented by hardware by executing corresponding software. The hardware or software includes one or more modules or units corresponding to the foregoing functions.

In a possible design, a structure of the network device includes a processor and a communications interface. The processor is configured to support the network device in performing corresponding functions in the foregoing methods. The communications interface is configured to support communication between the network device and another network element. The network device may further include a memory. The memory is configured to couple to the processor, and the memory stores a program instruction and data that are necessary for the network device.

According to a fourteenth aspect, an embodiment of this application provides a computer storage medium, where the storage medium includes a computer instruction, and when the instruction is executed by a computer, the computer is enabled to implement the communication method according to any one of the first aspect, the second aspect, the fifth aspect, and the sixth aspect.

According to a fifteenth aspect, an embodiment of this application provides a computer program product, where the program product includes a computer program, the computer program is stored in a readable storage medium, at least one processor of a communications apparatus may read the computer program from the readable storage medium, and the at least one processor executes the computer program to enable the communications apparatus to implement the communication method according to any one of the first aspect, the second aspect, the fifth aspect, and the sixth aspect.

According to a sixteenth aspect, an embodiment of this application provides a communications system, where the system includes the foregoing terminal device and network device.

According to the communication method, apparatus, device, and system, and the storage medium provided in the embodiments of this application, the network device sends the indication information to the terminal device, the terminal device determines, after receiving the indication information, whether the first time-frequency resource indicated by the indication information overlaps with the second time-frequency resource carrying the N uplink channels to be sent by the terminal device, and the terminal device adjusts, when determining that the first time-frequency resource overlaps with the second time-frequency resource, sending of the N uplink channels. Therefore, the information carried on the first time-frequency resource is ensured to be preferentially sent, to avoid, when the first time-frequency resource overlaps with the second time-frequency resource, interference caused by the information carried on the second time-frequency resource to the information carried on the first time-frequency resource. Further, accurate transmission of information the first time-frequency resource is ensured and uplink transmission efficiency of the communications system is improved. For example, in an application scenario in which there are both an eMBB service and a URLLC service, the URLLC service may be preferentially and completely transmitted, to improve transmission quality of the URLLC service.

DETAILED DESCRIPTION OF ILLUSTRATIVE EMBODIMENTS

Figure 1:
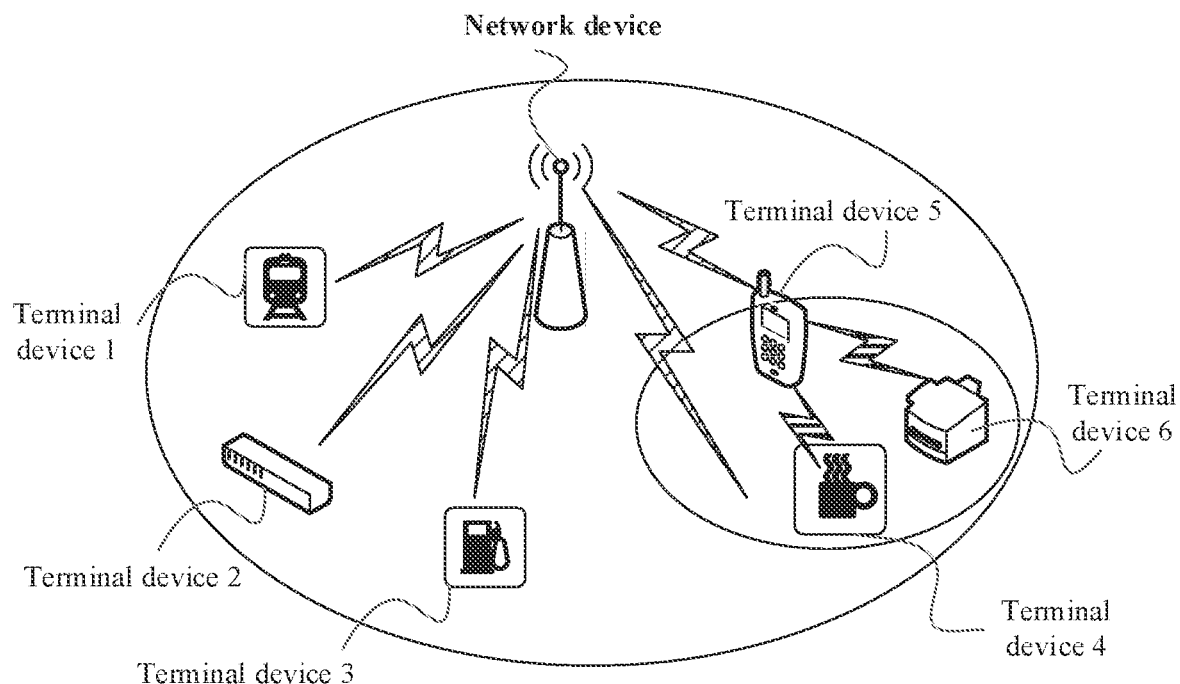
FIG. 1 is a schematic diagram of a communications system according to an embodiment of this application.

FIG. 1 is a schematic diagram of a communications system according to an embodiment of this application. As shown in FIG. 1, the communications system includes a network device and a terminal device.

The following explains and describes some terms in this application, to help a person skilled in the art have an understanding.

A network device is a device in a wireless network, for example, a radio access network (RAN) node that enables a terminal to access the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), and a wireless fidelity (Wi-Fi) access point (AP). In a network structure, the network device may include a centralized unit (CU) node, a distributed unit (DU) node, or a RAN device including a CU node and a DU node. This is not limited herein.

A terminal device may be a wireless terminal device or a wired terminal device. The wireless terminal device may be a device having a wireless transceiver function, and may be deployed on land, including indoor or outdoor devices, handheld devices, or vehicle-mounted devices; or may be deployed on a water surface (for example, on a steamboat); or may be deployed in the air (for example, on an airplane, a balloon, or a satellite). The terminal device may be a mobile phone (mobile phone), a tablet (Pad), a computer having a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like. This is not limited herein. It may be understood that, in the embodiments of this application, the terminal device may also be referred to as user equipment (UE).

The technical solutions described in the embodiments of this application may be applied to a plurality of communications systems, including a 2G, 3G, 4G, or 5G communications system, or a next generation communications system, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency division multiple access (Orthogonal Frequency-Division Multiple Access, OFDMA) system, a single carrier FDMA (SC-FDMA) system, a general packet radio service (GPRS) system, a long term evolution (LTE) system, and a new radio (NR) communications system.

In the embodiments of this application, the network device and the terminal device may communicate with each other by using a licensed spectrum, may communicate with each other by using an unlicensed spectrum, or may communicate with each other by using both a licensed spectrum and an unlicensed spectrum. The network device and the terminal device may communicate with each other by using a spectrum below 6 GHz, may communicate with each other by using a spectrum above 6 GHZ, or may communicate with each other by using both a spectrum below 6 GHz and a spectrum above 6 GHz. A spectrum resource used by the network device and the terminal device is not limited in the embodiments of this application.

In the embodiments of this application, a time-frequency resource is a general term of a time domain resource and a frequency domain resource. To be specific, the time-frequency resource includes the time domain resource and the frequency domain resource. The time-frequency resource may be used to carry control signaling or data used in a process of communication between the terminal device and the network device. The time domain resource may be represented by a time unit. The time unit described in the embodiments of this application refers to a segment of time domain resource used to carry information. For example, one time unit may include one or more consecutive transmission time intervals (TTI), one or more consecutive slots, or one or more consecutive time domain symbols. The slot may be a full slot, or may be a mini-slot (or referred to as a non-slot). Different time units are used to carry different data packets or different copies (or referred to as duplicate versions) of a same data packet. In the communications system shown in FIG. 1, the embodiments of this application mainly relate to uplink transmission, that is, a sending device is the terminal device, and a corresponding receiving device is the network device.

An uplink transmission service in the embodiments of this application may include but is not limited to an eMBB service, a URLLC service, an mMTC service, and the like. Typical eMBB services include an ultra high-definition video, augmented reality (AR), virtual reality (VR), and the like. These services are mainly characterized by a large data volume and a very high transmission rate. Typical URLLC services include tactile interaction applications such as wireless control in an industrial manufacturing or production process, motion control and remote repair of a self-driving automobile and an unmanned aerial vehicle, and remote medical surgery. These services are mainly characterized by requirements for ultra-high reliability and a low latency, a relatively small data volume, and burstiness. Typical mMTC services include power distribution automation of a smart grid, a smart city, and the like that are mainly characterized by a huge quantity of web-connected devices, a relatively small data volume, and insensitivity of data to a transmission latency. These mMTC terminals need to satisfy requirements for low costs and a very long standby time. Different services have different requirements on a mobile communications system. How to better support data transmission requirements of a plurality of different services is a technical problem that needs to be resolved in a current 5G and next generation communications system.

The following describes the technical solutions in the embodiments of this application with reference to the accompanying drawings in the embodiments of this application. In descriptions of this application, unless otherwise specified, "a plurality of" refers to two or more than two.

In addition, to clearly describe the technical solutions in the embodiments of this application, terms such as "first" and "second" are used in the embodiments of this application to distinguish between same items or similar items that have basically same functions and purposes. A person skilled in the art may understand that terms such as "first" and "second" do not limit a quantity or an execution sequence, and terms such as "first" and "second" do not indicate a definite difference.

Figure 2:
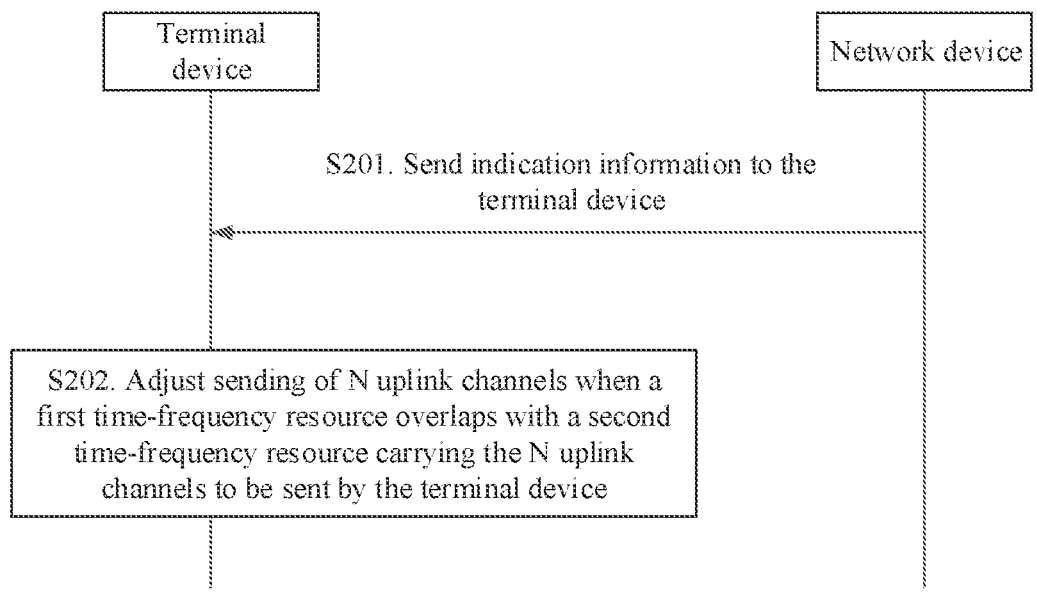
FIG. 2 is a flowchart of a communication method according to Embodiment 1 of this application.

FIG. 2 is a flowchart of a communication method according to Embodiment 1 of this application. As shown in FIG. 2, the method in this embodiment of this application may include the following steps.

S201. A network device sends indication information to a terminal device.

The indication information is used to indicate a first time-frequency resource.

Specifically, the first time-frequency resource may be a time-frequency resource allocated by the network device to another terminal device other than the terminal device, and may be used to carry an uplink service or uplink data transmitted by the another terminal device. The indication information may be used to indicate that the first time-frequency resource is used to carry the uplink service or the uplink data transmitted by the another terminal device.

Optionally, the indication information in this embodiment of this application may be an uplink preemption indication (UL PI), or uplink cancellation indication information, used to indicate a resource used by another terminal device for uplink transmission.

Optionally, the indication information may be group common signaling, and can be received by all UEs in a same serving cell or a same bandwidth part (BWP).

S202. The terminal device adjusts sending of N uplink channels when the first time-frequency resource overlaps with a second time-frequency resource carrying the N uplink channels to be sent by the terminal device.

N is a positive integer, that is, one or more uplink channels are carried on the second time-frequency resource.

The uplink channel in this embodiment of this application may be a physical uplink shared channel (PUSCH) used to carry uplink data, or may be a physical uplink control channel (PUCCH) used to transmit uplink control information, for example, a PUCCH with format 0, 1, 2, 3, or 4, or may be a physical initial access channel (Physical Random Access Channel, PRACH) used to transmit an initial random access preamble sequence.

In an example, this embodiment of this application may be applicable to a scenario in which the uplink channel is multiplexed for any type of eMBB services, URLLC services, or mMTC services. For example, this embodiment of this application is applicable to a scenario in which the uplink channel is multiplexed for two different eMBB services, two different URLLC services, or two different mMTC services. Optionally, this embodiment of this application is further applicable to a scenario in which the uplink channel is multiplexed for any two of an eMBB service, a URLLC service, and an mMTC service. For example, this embodiment of this application is applicable to a scenario in which the uplink channel is multiplexed for the eMBB service and the URLLC service. In this scenario, the terminal device currently executes the eMBB service, and the first time-frequency resource is used for carrying the URLLC service. Alternatively, this embodiment of the application is applicable to a scenario in which the uplink channel is multiplexed for the eMBB service and the mMTC service. In this scenario, the terminal device currently executes the eMBB service, and the first time-frequency resource is used for carrying the mMTC service. Alternatively, this embodiment of this application is applicable to a scenario in which the uplink channel is multiplexed for the URLLC service and the mMTC service. In this scenario, the terminal device currently executes the URLLC service, and the first time-frequency resource is used for carrying the mMTC service. Alternatively, in this scenario, the terminal device current executes the mMTC service, and the first time-frequency resource is used for carrying the URLLC service. A terminal device configured to transmit the eMBB service is denoted as eMBB UE, a terminal device configured to transmit a URLLC service is denoted as URLLC UE, and a terminal device configured to transmit an mMTC service is denoted as mMTC UE. It should be noted that the foregoing services are merely examples, and a service multiplexing scenario to which this embodiment of this application is applicable is not limited to multiplexing for the foregoing services.

For ease of description, this application is described by using an example in which the uplink channel is multiplexed for an eMBB service and a URLLC service. For multiplexing for other services, refer to that in this scenario. In this scenario, the terminal device currently executes an eMBB service, and is denoted as eMBB UE. The first time-frequency resource is used for carrying a URLLC service of another terminal device, and the another terminal device herein is denoted as URLLC UE.

The URLLC service has an extremely high requirement for a latency. If reliability is not considered, a transmission latency is required to be within 0.5 millisecond. On the premise of achieving 99.999% reliability, a transmission latency is required to be within 1 millisecond (ms).

A data packet of the URLLC service is generated unexpectedly and randomly, and no data packet may be generated within a very long period of time, or a plurality of data packets may be generated within a very short period of time. In most cases, the data packet of the URLLC service is a small data packet. For example, the data packet is 50 bytes.

In uplink transmission, the network device schedules the second time-frequency resource for the terminal device, for example, the eMBB UE. The second time-frequency resource is used for carrying the N uplink channels to be sent by the terminal device. In this case, if there is an unexpected URLLC service that needs to be transmitted, the URLLC UE first sends a scheduling request (SR) to the network device. To avoid mutual interference caused when the eMBB service and the URLLC service are transmitted on a same time-frequency resource, after receiving the SR, the network device sends the indication information to the eMBB UE. The indication information is used to indicate the first time-frequency resource, and the indication information indicates that the first time-frequency resource is used for uplink transmission of another terminal device, for example, the URLLC UE.

Figure 3:
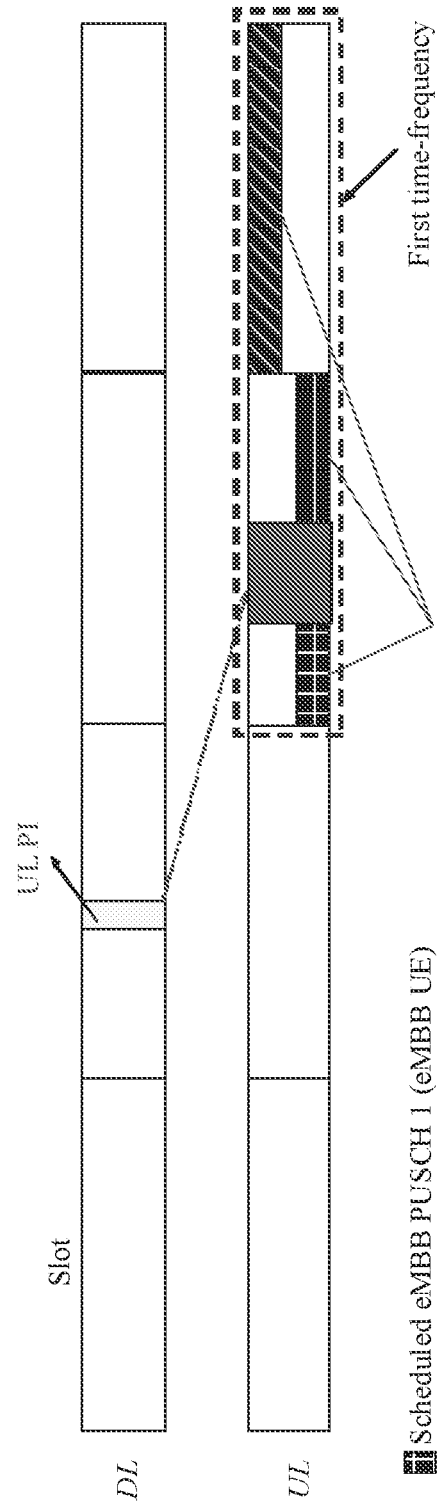
FIG. 3 is a schematic diagram of one first time-frequency resource carrying a plurality of uplink channels according to an embodiment of this application.

However, when a size of the first time-frequency resource indicated by the indication information and a size of a time-frequency resource required for actual transmission of the URLLC service are shown in FIG. 3, that is, the size of the first time-frequency resource indicated by the indication information is greater than the size of the time-frequency resource required for the actual transmission of the URLLC service, on the first time-frequency resource indicated by the indication information, not only an uplink channel of the URLLC UE can be carried, for example, a URLLC PUSCH is carried, but also an uplink channel of the eMBB UE can be carried, for example, an eMBB PUSCH 1, an eMBB PUSCH 2, and an eMBB PUSCH 1 whose transmission is canceled are carried. A part of the first time-frequency resource, used for transmission of the URLLC service may be indicated by a bit in a DCI field of the indication information.

It can be learned from a relationship between the first time-frequency resource and the second time-frequency resource shown in FIG. 3 that the first time-frequency resource indicated by the indication information may overlap with the second time-frequency resource carrying the N uplink channels to be sent by the terminal device. Particularly, when there is only one to-be-sent uplink channel on the second time-frequency resource, and a part of the second time-frequency resource overlaps with the first time-frequency resource, the second time-frequency resource is used to transmit eMBB service data. In this case, if both the eMBB service and the URLLC service are sent on an overlapped time-frequency resource, the eMBB service and the URLLC service may affect each other.

To resolve the technical problem, in this embodiment of this application, the terminal device receives the indication information from the network device, and determines, based on the first time-frequency resource indicated by the indication information, whether the first time-frequency resource overlaps with the second time-frequency resource. If the first time-frequency resource overlaps with the second time-frequency resource, sending of the N uplink channels carried on the second time-frequency resource is adjusted.

Figure 4:
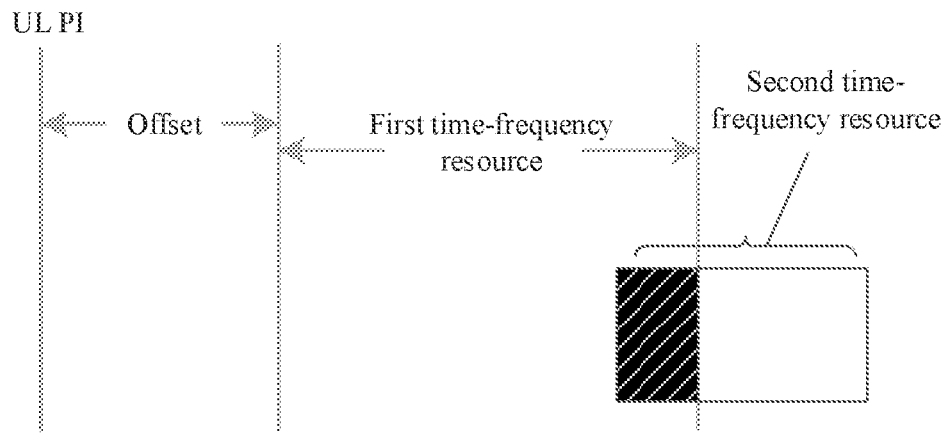
FIG. 4 and FIG. 5 are schematic diagrams of overlapping between a first time-frequency resource and a second time-frequency resource according to an embodiment of this application.
Figure 5:
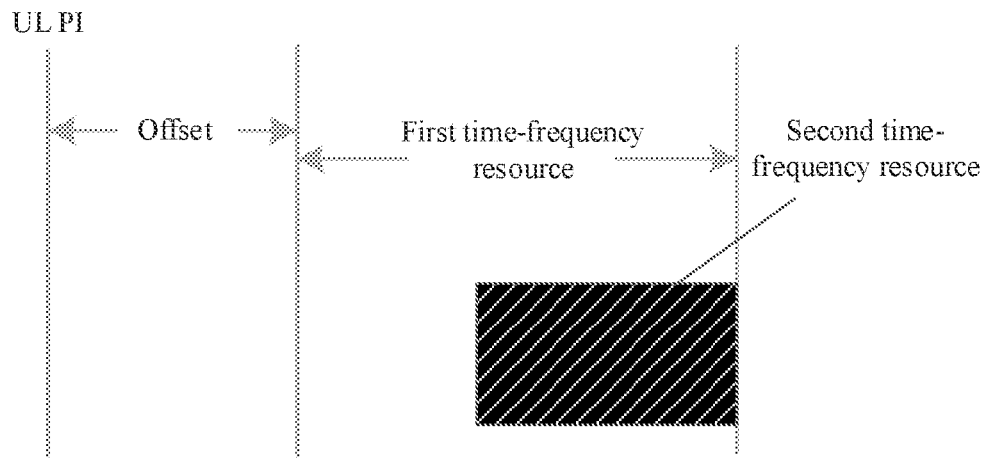

As shown in FIG. 4, overlapping between the first time-frequency resource and the second time-frequency resource may be that, a part of the second time-frequency resource overlaps with a part of the first time-frequency resource both in time domain and in frequency domain, and the other part of the second time-frequency resource does not overlap with the first time-frequency resource either in time domain or in frequency domain. Alternatively, a part of the second time-frequency resource overlaps with the first time-frequency resource both in time domain and in frequency domain, and the other part of the second time-frequency resource completely does not overlap with the first time-frequency resource neither in frequency domain nor in time domain. Alternatively, as shown in FIG. 5, the entire second time-frequency resource overlaps with the first time-frequency resource, that is, the entire second time-frequency resource is located within the first time-frequency resource.

In this embodiment of this application, adjusting sending of the uplink channels includes: skipping sending the uplink channels; suspending sending of the uplink channels; or discarding an uplink channel carried on a time-frequency resource that is in a second time-frequency resource and that overlaps with the first time-frequency resource, and sending one or more uplink channels carried on a time-frequency resource that is in the second time-frequency resource and that does not overlap with the first time-frequency resource.

Figure 6:
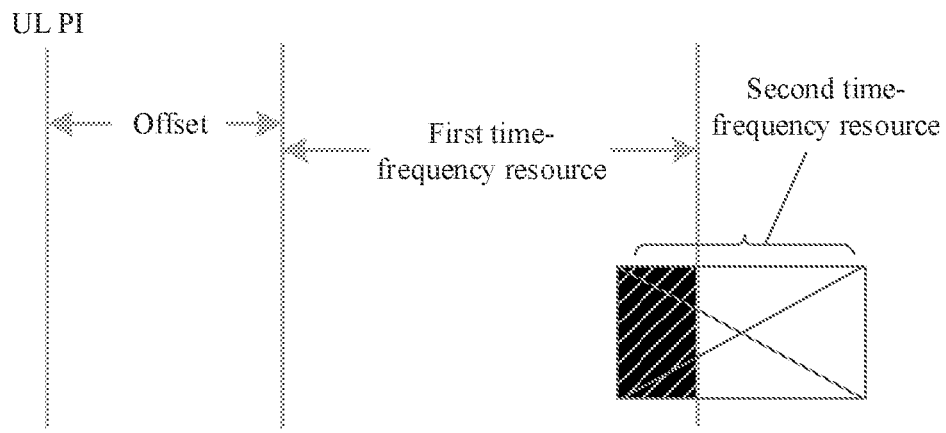
FIG. 6 is a schematic diagram of discarding all uplink channels that are on a second time-frequency resource according to an embodiment of this application.

In a first example, when the first time-frequency resource overlaps with the second time-frequency resource, to prevent the N uplink channels carried on the second time-frequency resource from interfering with uplink information carried on the first time-frequency resource, as shown in FIG. 6, none of the uplink channels carried on the second time-frequency resource is sent, that is, the N uplink channels carried on the second time-frequency resource are discarded. In this case, N may be a positive integer greater than or equal to 1.

In a second example, when the first time-frequency resource overlaps with the second time-frequency resource, to prevent the N uplink channels carried on the second time-frequency resource from interfering with uplink information carried on the first time-frequency resource, the uplink channels carried on the second time-frequency resource are temporarily not sent. After sending of the uplink information carried on the first time-frequency resource ends, the N uplink channels carried on the second time-frequency resource are sent.

Figure 7:
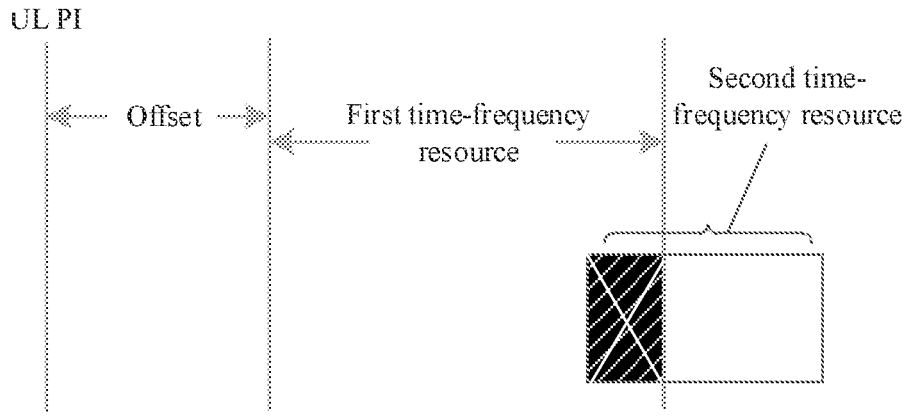
FIG. 7 is a schematic diagram of discarding some uplink channels that are on a second time-frequency resource according to an embodiment of this application.

In a third example, N is greater than or equal to 2, and at least one uplink channel is carried on the time-frequency resource that is in the second time-frequency resource and that does not overlap with the first time-frequency resource. In this case, to prevent the N uplink channels carried on the second time-frequency resource from interfering with uplink information carried on the first time-frequency resource, as shown in FIG. 7, an uplink channel carried on the time-frequency resource (that is, an uplink channel carried on a shaded part in FIG. 7) that is in the second time-frequency resource and that overlaps with the first time-frequency resource may temporarily not be sent, and an uplink channel carried on the time-frequency resource that is in the second time-frequency resource and that does not overlap with the first time-frequency resource is sent. After sending of uplink information carried on the time-frequency resource that is in the first time-frequency resource and that does not overlap with the second time-frequency resource ends, the uplink channel carried on the time-frequency resource that is in the second time-frequency resource and that overlaps with the first time-frequency resource is sent.

In a fourth example, N is greater than or equal to 2, and at least one uplink channel is carried on the time-frequency resource that is in the second time-frequency resource and that does not overlap with the first time-frequency resource. In this case, to prevent the N uplink channels carried on the second time-frequency resource from interfering with uplink information carried on the first time-frequency resource, as shown in FIG. 7, an uplink channel carried on the time-frequency resource that is in the second time-frequency resource and that overlaps with the first time-frequency resource may be discarded, and an uplink channel carried on a time-frequency resource that is in the second time-frequency resource and that does not overlap with the first time-frequency resource is sent.

In a fifth example, N is equal to 1, a part of the second time-frequency resource overlaps with the first time-frequency resource and a remaining part of the second time-frequency resource does not overlap with the first time-frequency resource. In this case, to prevent the N uplink channels carried on the second time-frequency resource from interfering with uplink information carried on the first time-frequency resource, the uplink channel carried on the second time-frequency resource is discarded.

In a sixth example, a part of the second time-frequency resource overlaps with a part of the first time-frequency resource, the other part of the second time-frequency resource does not overlap with the first time-frequency resource, and one uplink channel is carried on the second time-frequency resource or information carried on the N uplink channels carried on the second time-frequency resource is different. In this case, to prevent the N uplink channels carried on the second time-frequency resource from interfering with uplink information carried on the first time-frequency resource, the terminal device reassembles a packet without changing a size (that is, the quantity of carried bits) of an original transport block that is on the uplink channel carried on the second time-frequency resource or that is on the N uplink channels carried on the second time-frequency resource, to reduce the time-frequency resource carrying the uplink channel or the N uplink channels. Specifically, a size of a time-frequency resource may be adjusted by adjusting a modulation and coding scheme (MCS). Specifically, the size of the time-frequency resource may be adjusted by increasing a code rate, changing a modulation scheme, or increasing a quantity of bits carried on a modulation symbol. For example, a quadrature phase shift keying (QPSK) modulation scheme is adjusted to 16 quadrature amplitude modulation (QAM), or 16QAM is adjusted to 64QAM. In this way, the uplink channel or the N uplink channels obtained after the packet reassembling is/are carried and sent on the time-frequency resource that is in the second time-frequency resource and that does not overlap with the first time-frequency resource.

Optionally, because the indication information is sent by the network device, and the second time-frequency resource occupied by the N uplink channels is also scheduled by the network device, the network device knows that the first time-frequency resource indicated by the indication information overlaps with the second time-frequency resource. In this case, when sending the indication information to the terminal device, the network device may also send new uplink grant (UL grant) signaling to the terminal device. The new uplink grant signaling is used to indicate the terminal device to send the N uplink channels on a time-frequency resource that does not overlap with the first time-frequency resource.

According to the communication method in this embodiment of this application, the network device sends the indication information to the terminal device, the terminal device determines, after receiving the indication information, whether the first time-frequency resource indicated by the indication information overlaps with the second time-frequency resource carrying the N uplink channels to be sent by the terminal device, and the terminal device adjusts, when determining that the first time-frequency resource overlaps with the second time-frequency resource, sending of the N uplink channels. Therefore, the information carried on the first time-frequency resource is preferentially sent, to avoid, when the first time-frequency resource overlaps with the second time-frequency resource, interference caused by the information carried on the second time-frequency resource to the information carried on the first time-frequency resource. Further, transmission efficiency and transmission quality of the information on the first time-frequency resource are improved. For example, in an application scenario in which there are both an eMBB service and a URLLC service, the URLLC service may be preferentially and completely transmitted, to improve transmission quality of the URLLC service.

Figure 8:
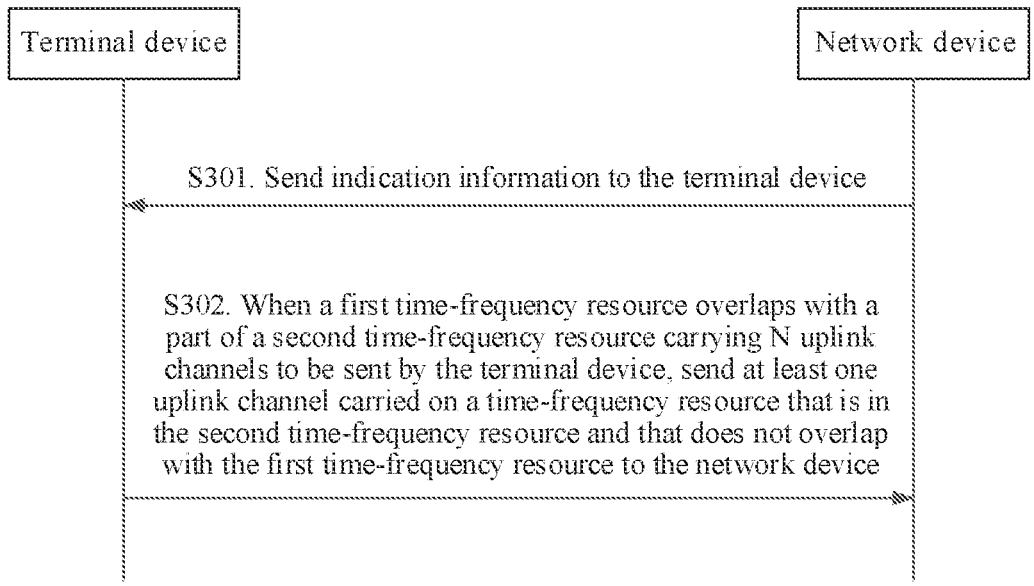
FIG. 8 is a flowchart of a communication method according to Embodiment 2 of this application.

FIG. 8 is a flowchart of a communication method according to Embodiment 2 of this application. Based on the foregoing embodiment, in this embodiment of this application, when the second time-frequency resource includes N time units, each time unit carries one of the uplink channels respectively, the uplink channels carry same information, M time units in the N time units overlap with the first time-frequency resource, and Q time units other than the M time units in the N time units do not overlap with the first time-frequency resource, as shown in FIG. 8, the method in this embodiment of this application may include the following steps.

S301. A network device sends indication information to a terminal device, where the indication information is used to indicate the first time-frequency resource.

The first time-frequency resource may be a time-frequency resource allocated by the network device to another terminal device. For specific descriptions, refer to related descriptions in other embodiments of this application. Details are not described again.

S302. When the first time-frequency resource overlaps with a part of the second time-frequency resource carrying N uplink channels to be sent by the terminal device, the terminal device sends, to the network device, at least one uplink channel carried on a time-frequency resource that is in the second time-frequency resource and that does not overlap with the first time-frequency resource.

It should be noted that in this embodiment of this application, N is a positive integer greater than or equal to 2, M and Q are positive integers less than or equal to N, M+Q=N, P is a positive integer less than or equal to Q, and R is a positive integer less than P.

In this embodiment of this application, the second time-frequency resource includes the N time units, each time unit carries one of the uplink channels, the uplink channels carry the same information, the M time units in the N time units overlap with the first time-frequency resource, and the Q time units other than the M time units in the N time units do not overlap with the first time-frequency resource. It may be understood that a quantity of the N time units is the same as a quantity of the N uplink channels described in S202, that is, one time unit carries one uplink channel.

Figure 9:
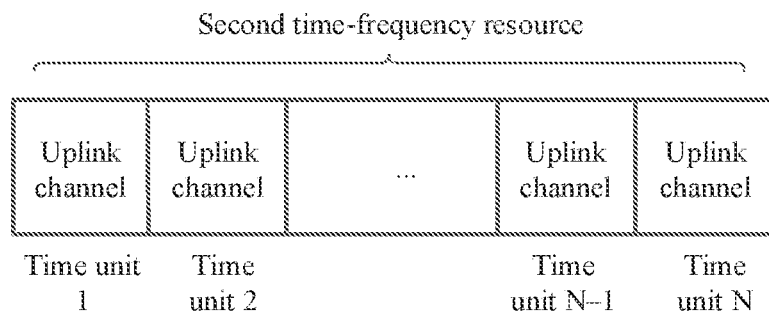
FIG. 9 is a schematic structural diagram of a second time-frequency resource according to Embodiment 2 of this application.

Specifically, as shown in FIG. 9, in this embodiment of this application, the second time-frequency resource includes the N time units, each time unit includes one or more symbols, and each time unit carries one uplink channel in the foregoing embodiment. In this way, the N time units totally carry N uplink channels. Information carried on the uplink channels is the same. For example, all the N uplink channels are a same PUSCH. In this way, the N uplink channels are repeatedly sent on the second time-frequency resource, thereby improving sending reliability of the uplink channels.

Optionally, the time unit in this embodiment of this application may be a mini-slot, and a quantity of symbols included in each mini-slot is less than 14.

A mini-slot-based (also referred to as non-slot-based) time domain scheduling granularity is used. Each mini-slot includes one or more symbols, for example, 2, 3, 4, 5, 6, 7, 8, 9, 10, 11, 12, or 13 symbols. Optionally, the symbol may be an orthogonal frequency division multiplexing (OFDM) symbol. Mini-slot-based scheduling can meet a requirement of small packet (which is usually 32 bytes, that is, a small packet is 256 bits) sending and meet a requirement for a low latency. To meet reliability requirement, in this embodiment of this application, according to a mini-slot-based repetition (mini-slot-based PUSCH repetition) method, N same uplink channels are repeatedly sent on the second time-frequency resource. This improves sending reliability of the uplink channels.

Optionally, a quantity of symbols included in the time unit in this embodiment of this application is less than 14. For example, the time unit in this embodiment of this application may be a mini-slot with one symbol, a mini-slot with two symbols, a mini-slot with four symbols, . . . , or a mini-slot with 14 symbols. Correspondingly, there may be a maximum of 13 uplink channels and a minimum of one uplink channel carried on the second time-frequency resource.

The mini-slot-based repetition may be a grant-based mini-slot-based repetition, or may be a configured grant (grant-free/configured grant) mini-slot-based repetition.

When the uplink channels are grant-based uplink channels, S302 may include: discarding uplink channels carried in the M time units, and sending uplink channels carried in the Q time units.

Correspondingly, that the network device receives the at least one uplink channel, carried on the time-frequency resource that is in the second time-frequency resource and that does not overlap with the first time-frequency resource, sent by the terminal device may include: receiving the uplink channels carried in the Q time units.

In this embodiment of this application, the second time-frequency resource, uplink grant (UL grant) indication information, and a hybrid automatic repeat request (HARQ) process number that are based on the mini-slot-based PUSCH repetition are all dynamically indicated by DCI. That is, the network device indicates a quantity of symbols included in each time unit in the second time-frequency resource.

Figure 10:
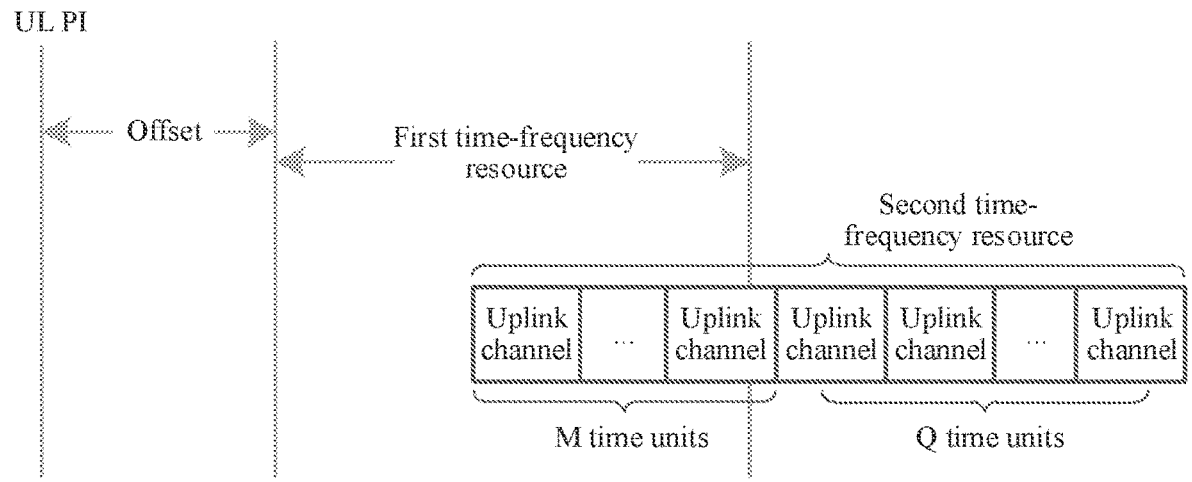
FIG. 10 is a schematic diagram of overlapping between a second time-frequency resource and a first time-frequency resource according to Embodiment 2 of this application.
Figure 11:
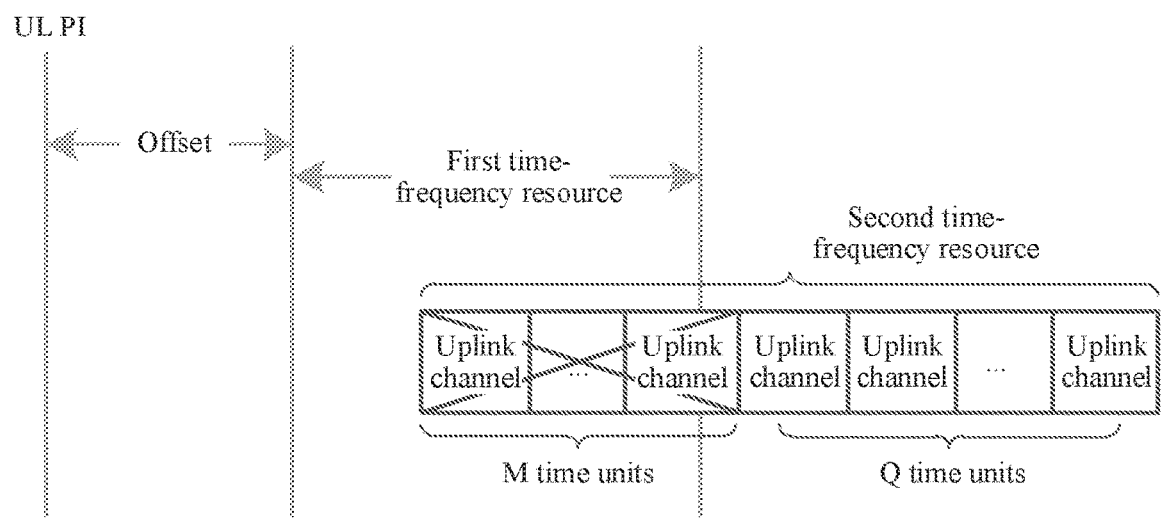
FIG. 11 and FIG. 12 are schematic diagrams of sending and discarding of a grant-based uplink channel according to Embodiment 2 of this application.

As shown in FIG. 10, in the N time units of the second time-frequency resource, the M time units overlap with the first time-frequency resource, and the Q time units do not overlap with the first time-frequency resource. In this case, as shown in FIG. 11, S302 may include: discarding the uplink channels carried in the M time units, and sending the uplink channels carried in the Q time units, to prevent the uplink channels carried on the second time-frequency resource from interfering with information carried on the first time-frequency resource. This improves reliability of sending the information carried on the first time-frequency resource. In addition, a plurality of same uplink channels are carried on the second time-frequency resource, and the uplink channels carried in the Q time units are sent, so that transmission of at least one uplink channel is ensured, thereby improving communication reliability and communication efficiency of a communications system.

Optionally, in this embodiment of this application, that the M time units in the N time units overlap with the first time-frequency resource may be that each time unit in the M time units completely belongs to the first time-frequency resource.

Optionally, as shown in FIG. 10, in this embodiment of this application, that the M time units in the N time units overlap with the first time-frequency resource may be that in at least one of the M time units, some symbols belong to the first time-frequency resource, and some symbols do not belong to the first time-frequency resource. For example, in an $M^{th}$ time unit, some symbols belong to the first time-frequency resource, and some symbols do not belong to the first time-frequency resource.

In a first example, in this embodiment of this application, each piece of uplink information corresponds to one demodulation reference signal (DMRS).

In a second example, P uplink channels in the N uplink channels share one DMRS, and P is a positive integer less than or equal to Q.

Based on the second example, this embodiment of this application further includes: when time units carrying R uplink channels in the P uplink channels belong to the Q time units, and time units carrying the DMRS belong to the M time units, determining that the R uplink channels share the first DMRS carried in the Q time units, where R is a positive integer less than P.

Optionally, in this embodiment of this application, when the quantity of uplink channels carried on the time-frequency resource that is in the second time-frequency resource and that does not overlap with the first time-frequency resource is less than P, the N uplink channels carried on the second time-frequency resource are discarded.

Specifically, in mini-slot-based repeated scheduling, one or two symbols in each slot is/are used to carry a demodulation reference signal (DMRS). In addition, a unit of non-slot-based or mini-slot-based transmission scheduling is relatively small, and is usually two, four, or seven symbols. Carrying the DMRS on the one or two symbols causes excessively large overheads in the non-slot-based or mini-slot-based scheduling. Therefore, a DMRS sharing method is proposed. Specifically, a DMRS is not configured or scheduled for each uplink channel, but a DMRS is configured or scheduled for one uplink channel, and several uplink channels share the DMRS. That is, the P uplink channels in the N uplink channels share one DMRS. After receiving the DMRS, the network device performs channel estimation on the P uplink physical channels, to correctly demodulate data blocks carried on the P uplink channels. For example, as shown in FIG. 12, two uplink channels share one DMRS, and the network device may demodulate two uplink channels based on a received DMRS.

Figure 12:
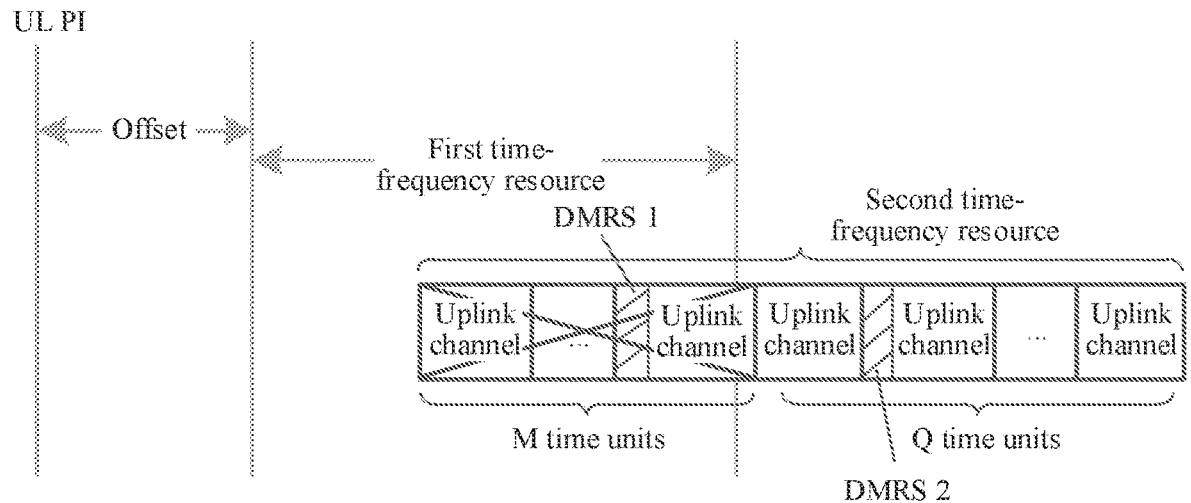

For example, as shown in FIG. 12, it is assumed that an uplink channel 1 and an uplink channel 2 share a DMRS 1, the uplink channel 1 is carried in a time unit 1, the uplink channel 2 is carried in a time unit 2, and the DMRS 1 is carried in the time unit 1. In addition, a symbol carrying the DMRS 1 in the time unit 1 exactly overlaps with the first time-frequency resource, but the time unit 2 carrying the uplink channel 2 does not overlap with the first time-frequency resource. In this case, the uplink channel 2 is sent, and the DMRS 1 is discarded. Therefore, the uplink channel 2 does not have a corresponding DMRS 1. In this case, a time unit 3 that is used to carry a DMRS 2 and that is after the time unit 2 does not overlap with the first time-frequency resource, that is, the DMRS 2 carried in the time unit 3 is sent. In this way, it can be determined that the uplink channel 2 shares the DMRS 2. In other words, a plurality of DMRSs carried on the second time-frequency resource are the same, and may be shared by same uplink channels.

According to the method in this embodiment of this application, when the uplink channels are grant-based uplink channels, the terminal device discards the uplink channels carried in the M time units, and sends the uplink channels carried in the Q time units. Correspondingly, the network device receives the uplink channels carried in the Q time units, to transmit at least one uplink channel carried on the second time-frequency resource while an uplink channel carried on the first time-frequency resource is accurately sent, so that uplink transmission reliability and transmission efficiency of the communications system are improved.

When the uplink channels are configured grant uplink channels, S302 may include: determining, in the Q time units, a target time unit that is the first time unit carrying a DMRS; discarding an uplink channel carried in a time unit that is before the target time unit and that is in the N time units; and sending an uplink channel carried in the target time unit and an uplink channel carried in a time unit that is after the target time unit and that is in the N time units.

Correspondingly, that the network device receives at least one uplink channel, carried on the time-frequency resource that is in the second time-frequency resource and that does not overlap with the first time-frequency resource, sent by the terminal device may include: The network device receives the uplink channel carried in the target time unit and the uplink channel carried in the time unit that is after the target time unit and that is in the N time units, where the target time unit is the first time unit carrying a DMRS in the Q time units.

In this embodiment of this application, the network device configures the configured grant resource for the terminal device, and the terminal device may send, on the configured grant resource, a service having a relatively high latency requirement to the network device, for example, a URLLC service. Because control and data information of the URLLC service require a low latency, an end-to-end latency may be as low as 0.5 ms. After the network device transmits downlink scheduling information, uplink transmission performed by the terminal device based on the scheduling information cannot meet this latency requirement, URLLC UE or a terminal device that supports both the URLLC service and another type of service may send uplink information on a configured grant resource.

However, before receiving a configured grant uplink channel, the network device does not know information such as a time-frequency resource occupied by the uplink channel, an amount of data transmitted on the uplink channel, and a HARQ process number. In N time units in a configured grant mini-slot PUSCH repetition, if M time units overlap with the first time-frequency resource, and Q time units do not overlap with the first time-frequency resource, an uplink channel carried in a time unit that is before the first DMRS that does not overlap with the first time-frequency resource is not sent, that is, transmission starts from a time unit in which the first DMRS is located and that does not overlap with the first time-frequency resource.

Figure 13:
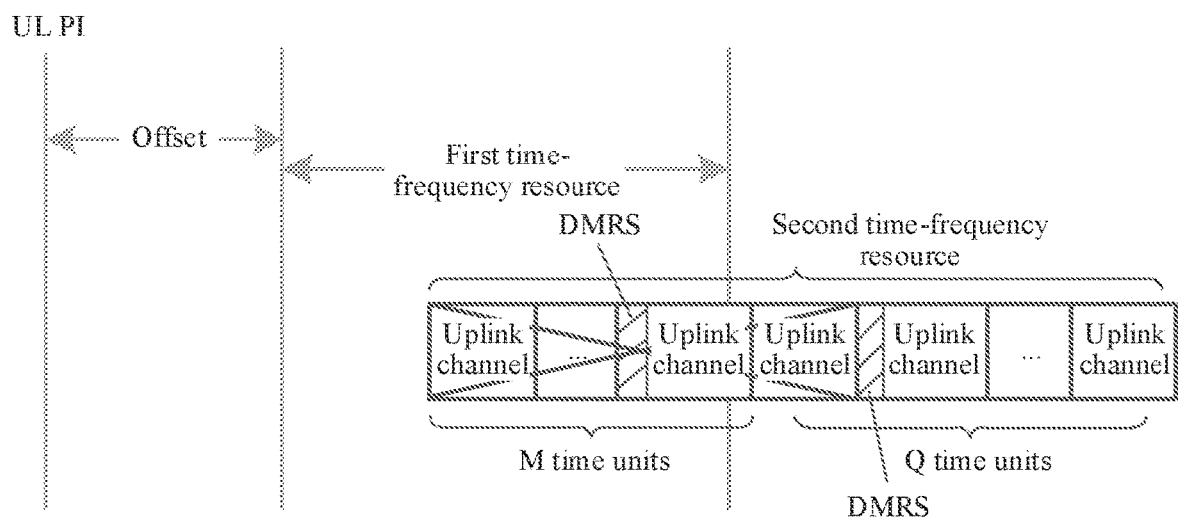
FIG. 13 is a schematic diagram of sending and discarding of a configured grant uplink channel according to Embodiment 2 of this application.

Specifically, as shown in FIG. 12, in the N time units included in the second time-frequency resource, when the M time units overlap with the first time-frequency resource, the Q time units do not overlap with the first time-frequency resource, and the uplink channels are configured grant uplink channels, as shown in FIG. 13, a target time unit that is the first time unit carrying a DMRS is determined in the Q time units, an uplink channel carried in a time unit that is before the target time unit and that is in the N time units is discarded, and an uplink channel carried in the target time unit and an uplink channel carried in a time unit that is after the target time unit and that is in the N time units are sent. In this way, the network device can accurately demodulate, based on a received DMRS, an uplink channel following the DMRS, thereby ensuring parsing accuracy of the uplink channel.

Optionally, the terminal device in this embodiment of this application starts sending from uplink information whose redundancy version (RV) is 0. Because a grant-free transmission service is random, when a redundancy sequence is (0, 2, 3, 1), it is specified that the first sent uplink channel is the uplink channel whose RV is 0. In this case, the network device needs to start blind detection only at a location corresponding to the RV 0, but does not need to perform blind detection at all of locations corresponding to RVs 0, 2, 3, and 1, so that complexity of blind detection of the network device can be reduced. In addition, transmission efficiency is relatively high when data starts to be transmitted from the uplink channel whose RV is 0. This is because the network device can successfully demodulate the data only after bits of all information are received.

According to the communication method provided in this embodiment of this application, in the N time units in the second time-frequency resource, the M time units overlap with the first time-frequency resource, and the Q time units other than the M time units in the N time units do not overlap with the first time-frequency resource. In this case, when the uplink channels are grant-based uplink channels, the terminal device discards the uplink channels carried in the M time units, and sends the uplink channels carried in the Q time units. When the uplink channels are configured grant uplink channels, the terminal device first determines, in the Q time units, the target time unit that is the first time unit carrying a DMRS, discards the uplink channel carried in the time unit that is before the target time unit and that is in the N time units, and sends the uplink channel carried in the target time unit and the uplink channel carried in the time unit that is after the target time unit and that is in the N time units, to transmit, in different cases when interference caused by information carried on the second time-frequency resource to the information carried on the first time-frequency resource is avoided, the at least one uplink channel carried on the second time-frequency resource while the uplink information carried on the first time-frequency resource is accurately sent, so that uplink transmission reliability and transmission efficiency of the communications system are improved.

Figure 14:
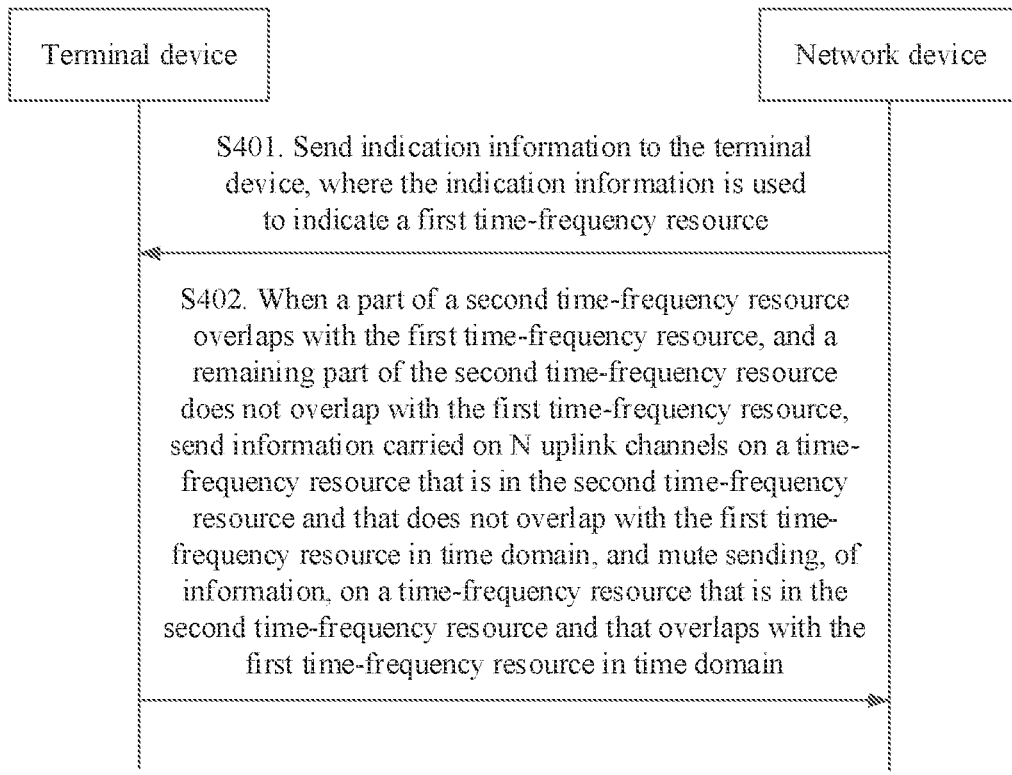
FIG. 14 is a flowchart of a communication method according to an embodiment of this application.

FIG. 14 is a flowchart of a communication method according to an embodiment of this application. Based on the foregoing embodiments, if the N uplink channels are PUCCHs with format 0, the method in this embodiment of this application may include the following steps.

S401. A network device sends indication information to a terminal device, where the indication information is used to indicate a first time-frequency resource.

The first time-frequency resource may be a time-frequency resource allocated by the network device to another terminal device. For specific descriptions, refer to related descriptions in S201 in the foregoing embodiment. Details are not described again.

S402. When a part of a second time-frequency resource overlaps with the first time-frequency resource, and a remaining part of the second time-frequency resource does not overlap with the first time-frequency resource, the terminal device sends information carried on the N uplink channels on the time-frequency resource that is in the second time-frequency resource and that does not overlap with the first time-frequency resource in time domain, and cancels sending, of information, on the time-frequency resource that is in the second time-frequency resource and that overlaps with the first time-frequency resource in time domain.

In this step, the canceling sending, of information, on the time-frequency resource that is in the second time-frequency resource and that overlaps with the first time-frequency resource in time domain may be understood as skipping sending the information on the time-frequency resource that is in the second time-frequency resource and that overlaps with the first time-frequency resource in time domain, or understood as discarding the information on the time-frequency resource that is in the second time-frequency resource and that overlaps with the first time-frequency resource in time domain.

Figure 15:
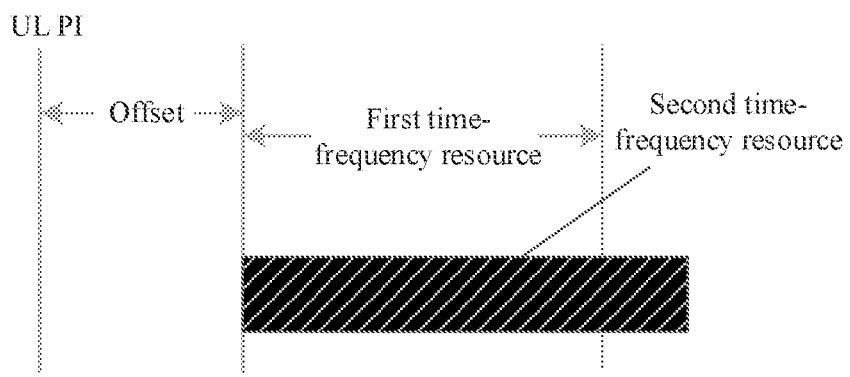
FIG. 15 is a schematic diagram of overlapping between a first time-frequency resource and a second time-frequency resource according to an embodiment of this application.

In this step, that the part of the second time-frequency resource overlaps with the first time-frequency resource, and the remaining part of the second time-frequency resource does not overlap with the first time-frequency resource may include two cases shown in FIG. 15 and FIG. 4. As shown in FIG. 15, the entire first time-frequency resource overlaps with a part of the second time-frequency resource, that is, the first time-frequency resource belongs to the second time-frequency resource, and a size of the second time-frequency resource is greater than a size of the first time-frequency resource. As shown in FIG. 4, the part of the second time-frequency resource overlaps with the part of the first time-frequency resource, and the remaining part of the second time-frequency resource does not overlap with the first time-frequency resource.

PUCCH formats include formats 0, 1, 2, 3, and 4. It is assumed that one PUCCH is carried on the second time-frequency resource. For a PUCCH with format 1 and a PUCCH with format 4, an orthogonal cover code (OCC) is usually used to perform orthogonal processing on information carried on a time domain resource. If the PUCCH with format 1 or format 4 occupies a plurality of symbols of the second time domain resource in time domain, a part of the plurality of symbols overlaps with the first time-frequency resource, and a remaining part of the plurality of symbols does not overlap with the first time-frequency resource, to ensure orthogonality of information carried on the PUCCH, the terminal device discards the PUCCH, that is, does not send the PUCCH.

A PUCCH with format 2 may include one or two orthogonal frequency division multiplexing (OFDM) symbols in time domain, and a PUCCH with format 3 may include 4 to 14 OFDM symbols in time domain. Because information carried on symbols of the PUCCH with format 2 or format 3 is different, if the PUCCH with format 2 or format 3 occupies a plurality of symbols of the second time-frequency resource in time domain, a part of the plurality of symbols overlap with the first time-frequency resource, and a remaining part of the plurality of symbols does not overlap with the first time-frequency resource, to ensure sending integrity of information carried on the PUCCH, the terminal device discards the PUCCH, that is, does not send the PUCCH.

Figure 16:
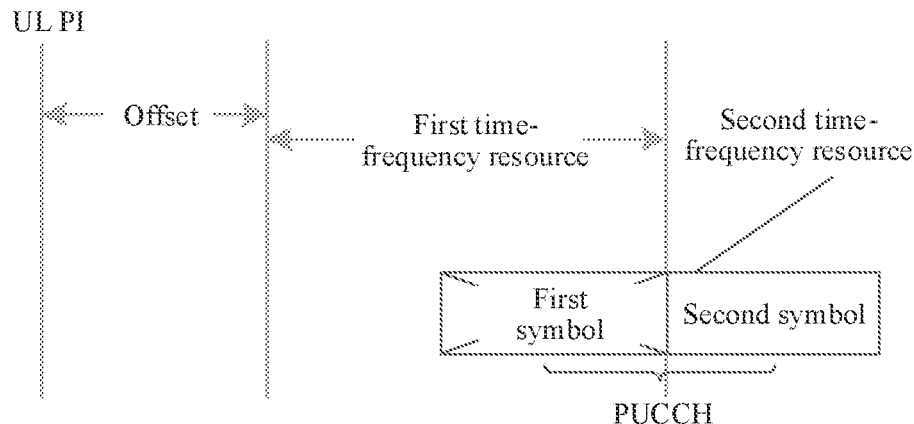
FIG. 16 is a schematic diagram of overlapping between a PUCCH with format 0 and a first time-frequency resource.

A PUCCH with format 0 is used to transmit positive or negative scheduling request (SR) information, or is used to transmit a hybrid automatic repeat request-acknowledgement (HARQ-ACK), and transmitted information includes one or two bits. A quantity of symbols occupied for transmission of the PUCCH with format 0 is two, that is, the PUCCH is carried on the first symbol and the second symbol of the second time domain resource, and information transmitted on the first symbol and information transmitted on the second symbol are the same. In this case, as shown in FIG. 16, when the first symbol overlaps with the first time-frequency resource, and the second symbol does not overlap with the first time-frequency resource, the information on the second symbol can be normally sent. In this way, retransmission of the PUCCH with format 0 can be avoided, thereby saving communication resources.

Therefore, when there are N PUCCHs with format 0 carried on the second time-frequency resource, and information carried on all symbols of a same PUCCH with format 0 is the same, the terminal device may send information carried on the N PUCCHs on the time-frequency resource that is in the second time-frequency resource and that does not overlap with the first time-frequency resource in time domain, and cancel transmission of information on the time-frequency resource that is in the second time-frequency resource and that overlaps with the first time-frequency resource in time domain.

In a first case, N=1, that is, one PUCCH with format 0 is carried on the second time domain resource. As shown in FIG. 16, the PUCCH occupies two symbols of the second time-frequency resource in time domain, which are denoted as a first symbol and a second symbol. The first symbol overlaps with the first time-frequency resource, and the second symbol does not overlap with the first time-frequency resource. In this case, the terminal device does not send information carried on the first symbol, but sends information carried on the second symbol. Because the information carried on the first symbol is the same as the information carried on the second symbol, after the information carried on the second symbol is sent, the PUCCH is not re-transmitted. Therefore, repeated sending of the PUCCH is avoided, and communication resources are saved.

Figure 17:
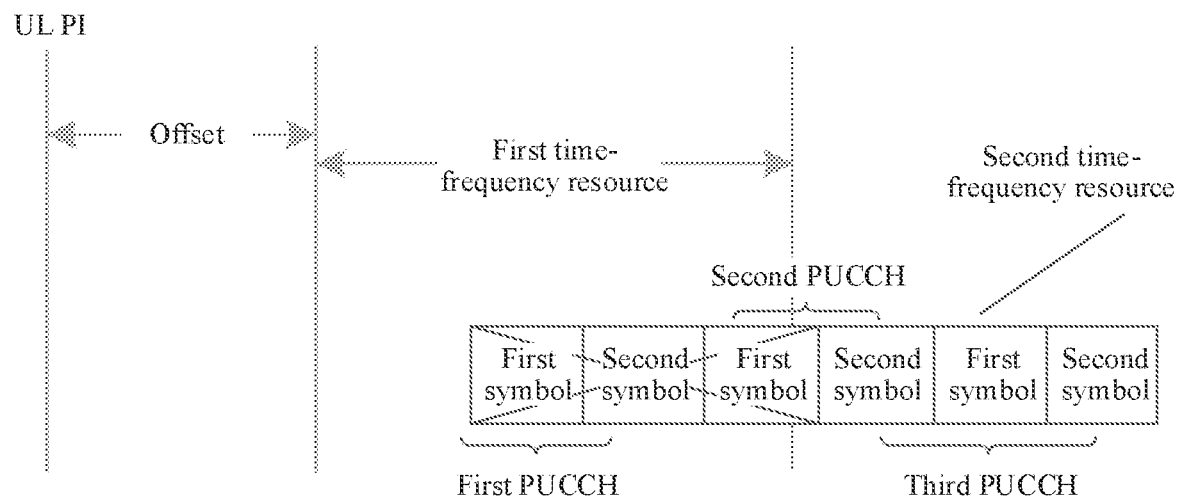
FIG. 17 is a schematic diagram of overlapping between a plurality of PUCCHs with format 0 and a first time-frequency resource.

In a second case, N is a positive integer greater than or equal to 2. It is assumed that N is 3, that is, three PUCCHs with format 0 are carried on the second time-frequency resource, and each PUCCH with format 0 occupies two symbols of the second time-frequency resource in time domain. For example, as shown in FIG. 17, a first PUCCH completely overlaps with the first time domain resource, a first symbol of a second PUCCH partially or completely overlaps with the first time-frequency resource, a second symbol of the second PUCCH completely does not overlap with the first time-frequency resource, and a third PUCCH completely does not overlap with the first time domain resource. In this case, the terminal device may send information carried on the third PUCCH and information carried on the second symbol of the second PUCCH, but does not send information carried on the first PUCCH or information carried on the first symbol of the second PUCCH.

Figure 18:
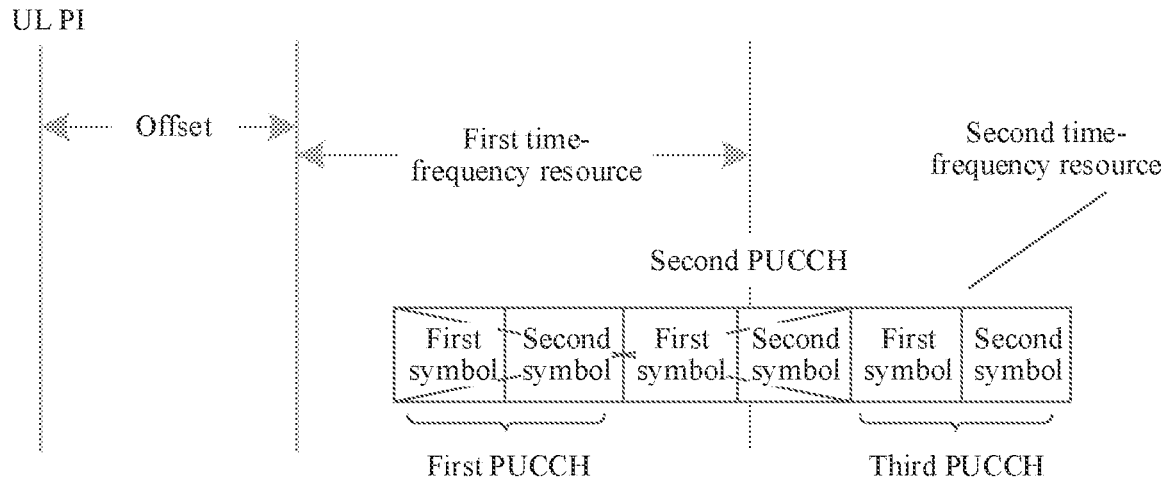
FIG. 18 is another schematic diagram of overlapping between a plurality of PUCCHs with format 0 and a first time-frequency resource.

In another example of the second case, as shown in FIG. 18, a first PUCCH completely overlaps with the first time domain resource, a first symbol of a second PUCCH completely overlaps with the first time-frequency resource, a part of a second symbol of the second PUCCH overlaps with the first time-frequency resource, a remaining part of the second symbol of the second PUCCH does not overlap with the first time-frequency resource, and a third PUCCH completely does not overlap with the first time domain resource. In this case, the terminal device may send information carried on the third PUCCH, but does not send information carried on the first PUCCH or information carried on the second PUCCH.

According to the communication method provided in this embodiment of this application, when N PUCCHs with format 0 are carried on the second time domain resource, because information carried on symbols of a same PUCCH with format 0 is the same, information on the N PUCCHs is sent on the time-frequency resource that is in the second time-frequency resource and that does not overlap with the first time-frequency resource in time domain, and sending, of information, on the time-frequency resource that is in the second time-frequency resource and that overlaps with the first time-frequency resource in time domain is muted. This avoids retransmission of the PUCCHs without affecting other transmission, improves transmission efficiency of a communications system, and saves communication resources.

It should be noted that, in the foregoing embodiments, that the terminal device adjusts sending of the N uplink channels includes: The terminal device adjusts sending of the N uplink channels when a first time interval is less than a second time interval, where the first time interval is a time required by the terminal device to process the indication information sent by the network device, and the second time interval is a time interval between a time at which the terminal device receives the indication information and a time at which the terminal device starts to send the N uplink channels. For example, the N uplink channels are one PUCCH with format 0, and the second time interval is a time interval between a time at which the terminal device receives the indication information from the network device and a time at which the terminal device starts to send the PUCCH.

In an example, assuming that the N uplink channels are one PUCCH with format 0, the terminal device receives, at a time a from the network device, the indication information indicating the first time domain resource, and then processes the indication information. It is assumed that a time required for processing the indication information is b, that is, the first interval is b. The second time interval is a time interval between the time a at which the terminal device receives the indication information from the network device and a time c at which the terminal device starts to send the PUCCH, that is, the second time interval is c−a. To terminate sending of a part of the PUCCH or sending of the entire PUCCH in time, processing of the indication information needs to be completed before the PUCCH is sent, that is, c−a is greater than b.

Figure 19:
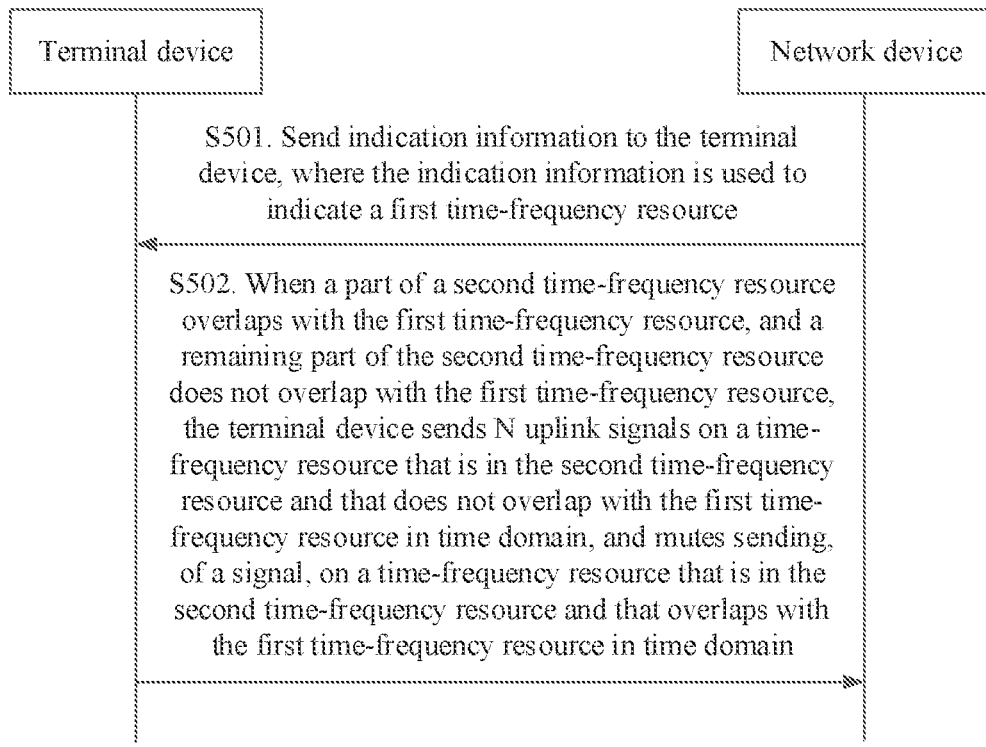
FIG. 19 is a flowchart of a communication method according to an embodiment of this application.

FIG. 19 is a flowchart of a communication method according to an embodiment of this application. Based on the foregoing embodiments, if N uplink signals are carried on a second time domain resource, the method in this embodiment of this application may include the following steps.

S501. A network device sends indication information to a terminal device, where the indication information is used to indicate a first time-frequency resource.

The first time-frequency resource may be a time-frequency resource allocated by the network device to another terminal device. For specific descriptions, refer to related descriptions in S201 in the foregoing embodiment. Details are not described again.

S502. When a part of the second time-frequency resource overlaps with the first time-frequency resource, and a remaining part of the second time-frequency resource does not overlap with the first time-frequency resource, the terminal device sends the N uplink signals on the time-frequency resource that is in the second time-frequency resource and that does not overlap with the first time-frequency resource in time domain, and mutes sending, of a signal, on the time-frequency resource that is in the second time-frequency resource and that overlaps with the first time-frequency resource in time domain.

In this step, that the part of the second time-frequency resource overlaps with the first time-frequency resource, and the remaining part of the second time-frequency resource does not overlap with the first time-frequency resource may include two cases shown in FIG. 15 and FIG. 4. As shown in FIG. 15, the entire first time-frequency resource overlaps with a part of the second time-frequency resource, that is, the first time domain resource belongs to the second time domain resource, and the second time domain resource is greater than the first time domain resource. As shown in FIG. 4, the part of the second time-frequency resource overlaps with the part of the first time-frequency resource, and the remaining part of the second time-frequency resource does not overlap with the first time-frequency resource.

It should be noted that the N uplink signals are the same, each uplink signal occupies a plurality of symbols of the second time-frequency resource in time domain, and information carried on the symbols is the same. In this case, to avoid repeated sending of the uplink signals, the terminal device sends the N uplink signals on the time-frequency resource that is in the second time-frequency resource and that does not overlap with the first time-frequency resource in time domain, and mutes sending, of the signal, on the time-frequency resource that is in the second time-frequency resource and that overlaps with the first time-frequency resource in time domain, to improve system transmission efficiency.

Optionally, the N uplink signals are SRSs, and the SRSs are mainly used to estimate uplink channel quality. A scheduler in a base station may allocate, based on uplink channel state estimation, a resource block (RB) in a good instantaneous channel state to the terminal device to transmit an uplink PUSCH. The SRS may be further used to estimate uplink timing, uplink beam management, and the like. In frequency domain, the SRSs can cover a frequency band that the scheduler is interested in. A plurality of "narrowband SRSs" can be sent and frequency hopping can be performed in frequency domain. Then, a series of sent SRSs can be combined to cover the entire frequency band that the scheduler is interested in. In this way, an available transmit power can be concentrated in a narrower frequency range, and frequency hopping is performed in a frequency band, to obtain a frequency gain.

The SRS may be repeatedly sent on symbols in one slot. $N_{symb}^{SRS} \in \{1,2,4\}$ is a quantity, of OFDM symbols occupied by the SRS in one slot, configured through higher layer signaling, R is a quantity, of times for which the SRS is repeatedly sent in the slot, configured through higher layer signaling, and $R \leq N_{symb}^{SRS} \in \{1,2,4\}$.

Figure 20:
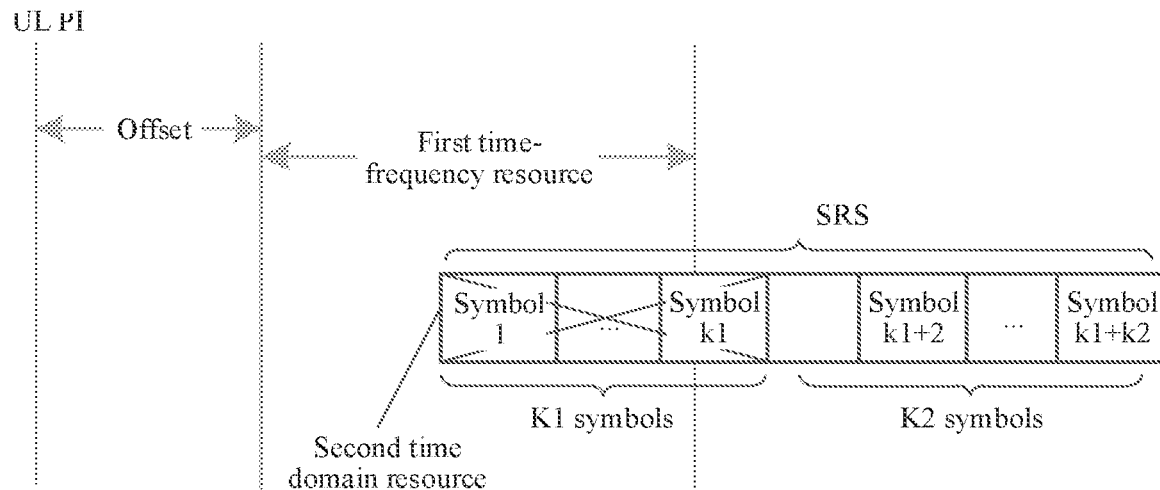
FIG. 20 is another schematic diagram of overlapping between an SRS and a first time-frequency resource.

In an example, N is 1, that is, one uplink signal is carried on the second time-frequency resource, for example, one SRS is carried. The SRS occupies a plurality of symbols of the second time-frequency resource in frequency domain. As shown in FIG. 20, the SRS occupies K symbols of the second time domain resource in frequency domain, where K1 symbols in the K symbols overlap with the first time domain resource, K2 symbols other than the K1 symbols in the K symbols do not overlap with the first time domain resource, and a sum of K1 and K2 is equal to K. In this case, the terminal device may send signals carried on the K2 symbols, but may not send signals carried on the K1 symbols. Because signals carried on all of the K symbols are the same, the SRS can be sent by sending the signals carried on the K2 symbols. In this way, repeated sending of the SRS can be avoided, and communication resources are saved.

As shown in FIG. 20, there are two cases when a symbol k1 carrying the SRS overlaps with the first time-frequency resource. In a case 1, the symbol k1 is entirely located in the first time-frequency resource, that is, the symbol k1 completely overlaps with the first time-frequency resource. In a case 2, a part of the symbol k1 is located in the first time-frequency resource, and a remaining part of the symbol k1 is located outside the first time-frequency resource.

It should be noted that, that the terminal device adjusts sending of the N uplink signals includes: The terminal device adjusts sending of the N uplink signals when a third time interval is less than a fourth time interval, where the third time interval is a time required by the terminal device to process the indication information sent by the network device, and the fourth time interval is a time interval between a time at which the terminal device receives the indication information and a time at which the terminal device starts to send the N uplink signals.

According to the communication method provided in this embodiment of this application, when the N uplink signals are carried on the second time domain resource, the N uplink signals are the same, each uplink signal occupies a plurality of symbols of the second time-frequency resource in time domain, and information carried on the symbols is the same, and when the part of the second time domain resource overlaps with the first time domain resource, and the other part of the second time domain resource does not overlap with the first time domain resource, the terminal device sends the N uplink signals on the time-frequency resource that is in the second time-frequency resource and that does not overlap with the first time-frequency resource in time domain, and mutes sending, of the signal, on the time-frequency resource that is in the second time-frequency resource and that overlaps with the first time-frequency resource in time domain, thereby avoiding retransmission of the uplink signals, and improving system transmission efficiency.

Figure 21:
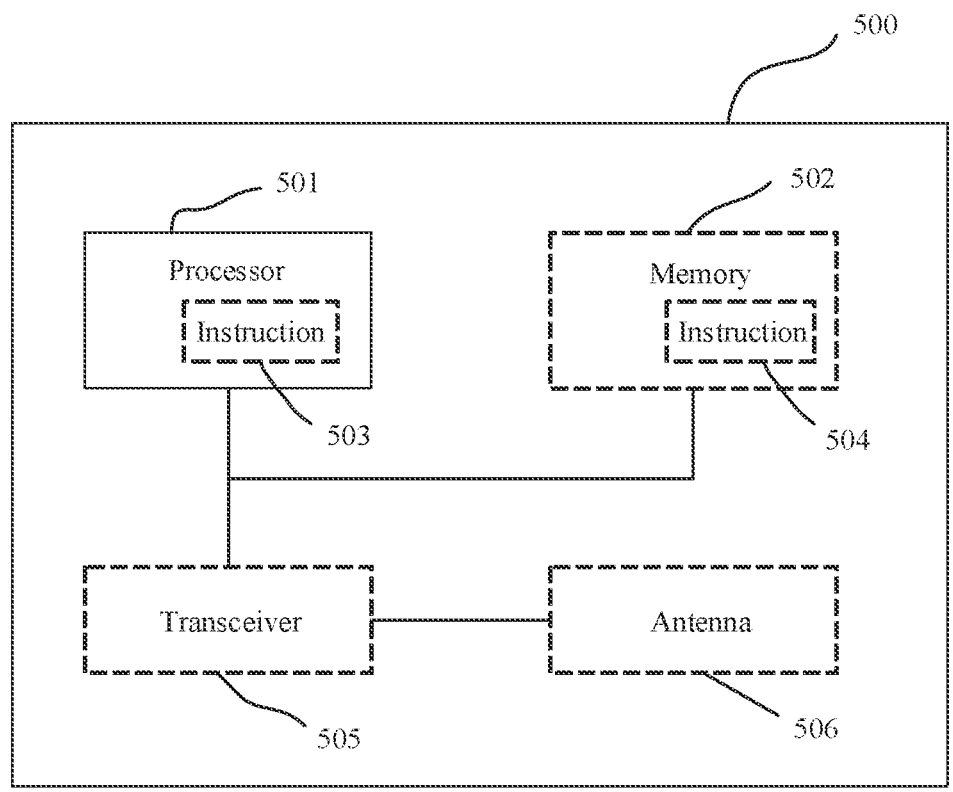
FIG. 21 is a schematic structural diagram of a communications device according to an embodiment of this application.

FIG. 21 is a schematic structural diagram of a communications device according to an embodiment of this application. As shown in FIG. 21, the communications device 500 in this embodiment may be the terminal device (or a component that can be used in the terminal device) or the network device (or a component that can be used in the network device) mentioned in the foregoing method embodiments. The communications device may be configured to implement the method that corresponds to the terminal device or the network device and that is described in the foregoing method embodiments. For details, refer to descriptions in the foregoing method embodiments.

The communications device 500 may include one or more processors 501. The processor 501 may also be referred to as a processing unit, and may implement a specific control or processing function. The processor 501 may be a general-purpose processor, a dedicated processor, or the like. For example, the processor 501 may be a baseband processor or a central processing unit. The baseband processor may be configured to process a communication protocol and communication data. The central processing unit may be configured to control the communications device, execute a software program, and process data of the software program.

In a possible design, the processor 501 may also store an instruction 503 or data (for example, intermediate data). The instruction 503 may be run by the processor, so that the communications device 500 performs the method that corresponds to the terminal device or the network device and that is described in the foregoing method embodiments.

In another possible design, the communications device 500 may include a circuit, and the circuit may implement a sending, receiving, or communication function in the foregoing method embodiments.

Optionally, the communications device 500 may include one or more memories 502, where an instruction 504 may be stored in the memory 502, and the instruction may be run on the processor, so that the communications device 500 performs the method described in the foregoing method embodiments.

Optionally, the processor and the memory may be disposed separately or may be integrated together.

Optionally, the communications device 500 may further include a transceiver 505 and/or an antenna 506. The processor 501 may be referred to as a processing unit, and controls the communications device (for example, a terminal device or a network device). The transceiver 505 may be referred to as a transceiver unit, a transceiver machine, a transceiver circuit, or the like, and is configured to implement a transceiver function of the communications device.

In a design, the communications device 500 is configured to implement operations corresponding to the terminal device in the foregoing embodiments. For example, the transceiver 505 may receive indication information from a network device, where the indication information is used to indicate a first time-frequency resource. The processor 501 adjusts sending of N uplink channels when the first time-frequency resource overlaps with a second time-frequency resource carrying the N uplink channels to be sent by the terminal device. Alternatively, the transceiver 505 receives indication information from a network device, when a part of a second time-frequency resource overlaps with a first time-frequency resource, and a remaining part of the second time-frequency resource does not overlap with the first time-frequency resource, sends N uplink channels on the time-frequency resource is in the second time-frequency resource and that does not overlap with the first time-frequency resource in time domain, and mutes sending, of a signal, on the time-frequency resource that is in the second time-frequency resource and that overlaps with the first time-frequency resource in time domain, where the N uplink channels are uplink control channels with format 0.

For specific implementation processes of the transceiver 505 and the processor 501, refer to related descriptions in the foregoing embodiments. Details are not described herein again.

In another design, the communications device is configured to implement operations corresponding to the network device in the foregoing embodiments. For example, the transceiver 505 may send indication information to a terminal device, and when a first time-frequency resource overlaps with a second time-frequency resource carrying N uplink channels to be sent by the terminal device, the transceiver 505 receives, from the terminal device, at least one uplink channel carried on a time-frequency resource that is in the second time-frequency resource and that does not overlap with the first time-frequency resource. Alternatively, the transceiver 505 receives, when a part of a second time-frequency resource overlaps with a first time-frequency resource, and a remaining part of the second time-frequency resource does not overlap with the first time-frequency resource, N uplink signals on the time-frequency resource that is in the second time-frequency resource and that does not overlap with the first time-frequency resource.

For a specific implementation process of the transceiver 505, refer to related descriptions in the foregoing embodiments. Details are not described herein again.

The processor 501 and the transceiver 505 that are described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-channel metal oxide semiconductor (nMetal-oxide-semiconductor, NMOS), a P-channel metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

Although in the descriptions of the foregoing embodiment, the communications device 500 is described by using the terminal device or the network device as an example, the communications device described in this application is not limited to the terminal device or the network device, and a structure of the communications device may not be limited by FIG. 21.

The communications device in this embodiment of this application may be configured to perform the technical solutions performed by the terminal device (or the network device) in the foregoing method embodiments. Implementation principles and technical effects thereof are similar, and details are not described herein again.

Figure 22:
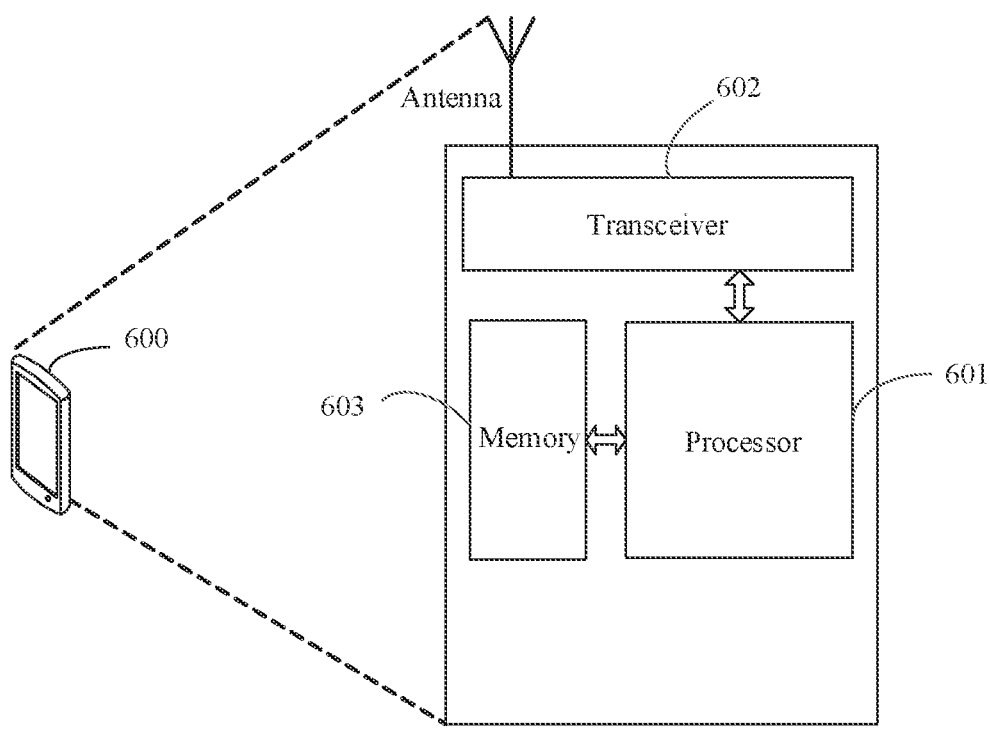
FIG. 22 is a schematic structural diagram of a terminal device according to an embodiment of this application.

FIG. 22 is a schematic structural diagram of a terminal device according to an embodiment of this application. The terminal device 600 may implement functions performed by the terminal device in the foregoing method embodiments. The functions may be implemented by hardware, or may be implemented by hardware by executing corresponding software. The hardware or software includes one or more modules or units corresponding to the foregoing functions.

In a possible design, a structure of the terminal device 600 includes a processor 601, a transceiver 602, and a memory 603. The processor 601 is configured to support the terminal device 600 in performing a corresponding function in the foregoing methods. The transceiver 602 is configured to support communication between the terminal device 600 and another terminal device or a network device. The terminal device 600 may further include the memory 603. The memory 603 is configured to couple to the processor 601, and the memory 603 stores a program instruction and data that are necessary for the terminal device 600.

After the terminal device 600 is powered on, the processor 601 may read the program instruction and the data in the memory 603, interpret and execute the program instruction, and process data of the program instruction. When data needs to be sent, after performing baseband processing on the to-be-sent data, the processor 601 outputs a baseband signal to the transceiver 602. After performing radio frequency processing on the baseband signal, the transceiver 602 sends a radio frequency signal in a form of an electromagnetic wave by using an antenna. When data is sent to the terminal device, the transceiver 602 receives a radio frequency signal by using the antenna, converts the radio frequency signal into a baseband signal, and outputs the baseband signal to the processor 601. The processor 601 converts the baseband signal into data and processes the data.

A person skilled in the art may understand that, for ease of description, FIG. 22 shows only one memory 603 and one processor 601. Actually, the terminal device 600 may include a plurality of processors 601 and a plurality of memories 603. The memory 603 may also be referred to as a storage medium, a storage device, or the like. This is not limited in this embodiment of this application.

The terminal device in this embodiment of this application may be configured to perform the technical solutions performed by the terminal device in the foregoing method embodiments. Implementation principles and technical effects thereof are similar, and details are not described herein again.

Figure 23:
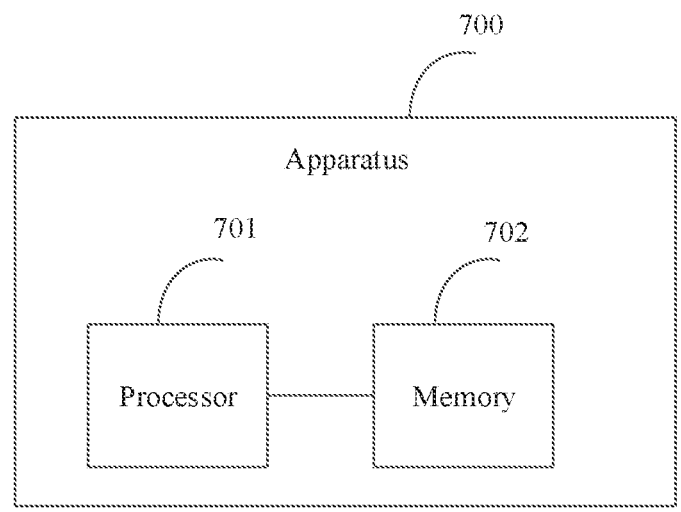
FIG. 23 is a schematic structural diagram of an apparatus according to an embodiment of this application.

FIG. 23 is a schematic structural diagram of an apparatus according to an embodiment of this application. The apparatus 700 exists in a product form of a chip. A structure of the apparatus includes a processor 701 and a memory 702. The memory 702 is configured to couple to the processor 701. The memory 702 stores a program instruction and data that are necessary for the apparatus. The processor 701 is configured to execute the program instruction stored in the memory 702, so that the apparatus performs functions of the terminal device in the foregoing method embodiments.

The apparatus in this embodiment of this application may be configured to perform the technical solutions performed by the terminal device in the foregoing method embodiments. Implementation principles and technical effects thereof are similar, and details are not described herein again.

Figure 24:
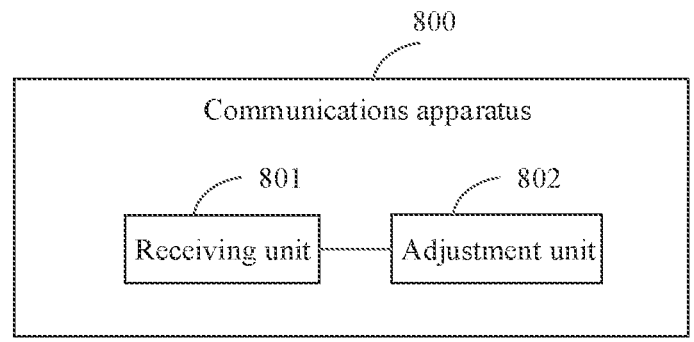
FIG. 24 is a schematic structural diagram of a communications apparatus according to Embodiment 1 of this application.

FIG. 24 is a schematic structural diagram of a communications apparatus according to Embodiment 1 of this application. The communications apparatus may be a terminal device, or may be a component (for example, an integrated circuit or a chip) of a terminal device. As shown in FIG. 24, the communications apparatus 800 may include a receiving unit 801 and an adjustment unit 802.

The receiving unit 801 and the adjustment unit 802 may implement the method on a terminal device side in FIG. 2, FIG. 8, FIG. 14, or FIG. 19. For example, the receiving unit 801 is configured to receive indication information from a network device, where the indication information is used to indicate a first time-frequency resource. The adjustment unit 802 is configured to: when the first time-frequency resource overlaps with a second time-frequency resource carrying N uplink channels to be sent by the terminal device, receive at least one uplink channel carried on a time-frequency resource that is in the second time-frequency resource and that does not overlap with the first time-frequency resource from the terminal device, where N is a positive integer greater than or equal to 2.

Figure 25:
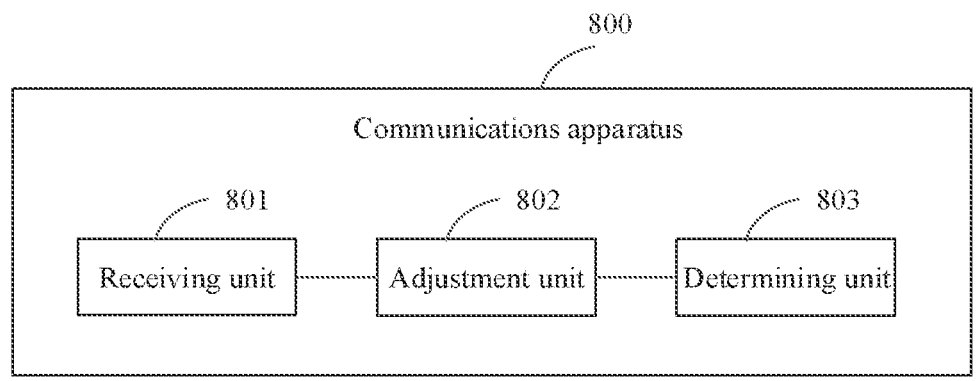
FIG. 25 is a schematic structural diagram of a communications apparatus according to Embodiment 2 of this application.

FIG. 25 is a schematic structural diagram of a communications apparatus according to Embodiment 2 of this application. Based on the foregoing embodiment, as shown in FIG. 25, the communications apparatus in this embodiment of this application further includes a determining unit 803.

The determining unit 803 is configured to: when time units carrying R uplink channels in P uplink channels belong to Q time units, and time units carrying DMRS belong to M time units, determine that the R uplink channels share the first DMRS carried in the Q time units, where R is a positive integer less than P.

The communications apparatus in this embodiment of this application may be configured to perform the technical solutions performed by the terminal device in the foregoing method embodiments. Implementation principles and technical effects thereof are similar, and details are not described herein again.

Figure 26:
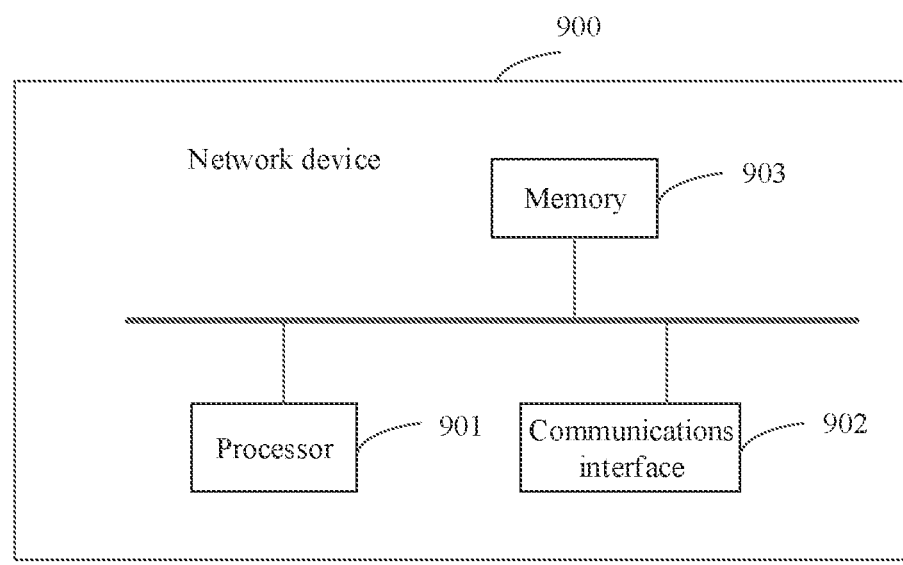
FIG. 26 is a schematic structural diagram of a network device according to an embodiment of this application.

FIG. 26 is a schematic structural diagram of a network device according to an embodiment of this application. The network device 900 may implement functions performed by the network device in the foregoing method embodiments. The functions may be implemented by hardware, or may be implemented by hardware by executing corresponding software. The hardware or software includes one or more modules or units corresponding to the foregoing functions.

In a possible design, a structure of the network device 900 includes a processor 901 and a communications interface 902, and the processor 901 is configured to support the network device 900 in performing a corresponding function in the foregoing methods. The communications interface 902 is configured to support communication between the network device 900 and another network element. The network device 900 may further include a memory 903. The memory 903 is configured to couple to the processor 901, and the memory 903 stores a program instruction and data that are necessary for the network device 900.

A person skilled in the art may understand that, for ease of description, FIG. 26 shows only one memory 903 and one processor 901. Actually, the network device 900 may include a plurality of processors 901 and a plurality of memories 903. The memory 903 may also be referred to as a storage medium, a storage device, or the like. This is not limited in this embodiment of this application.

The network device in this embodiment of this application may be configured to perform the technical solutions performed by the network device in the foregoing method embodiments. Implementation principles and technical effects thereof are similar, and details are not described herein again.

Figure 27:
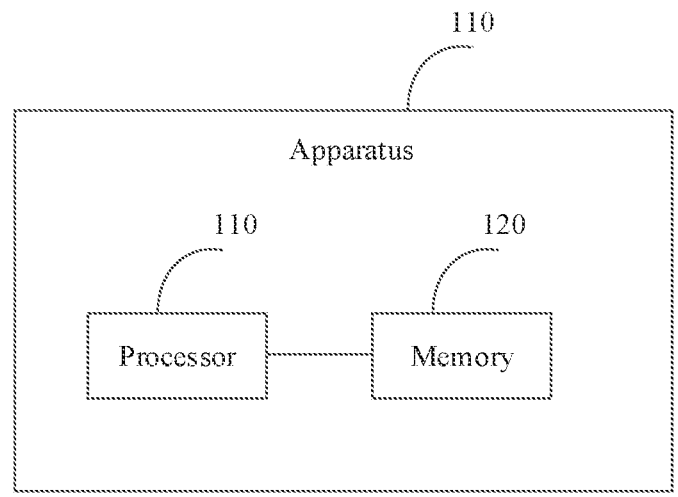
FIG. 27 is a schematic structural diagram of an apparatus according to an embodiment of this application.

FIG. 27 is a schematic structural diagram of an apparatus according to an embodiment of this application. The apparatus 100 exists in a product form of a chip. A structure of the apparatus includes a processor 110 and a memory 120. The memory 120 is configured to couple to the processor 110. The memory 120 stores a program instruction and data that are necessary for the apparatus. The processor 110 is configured to execute the program instruction stored in the memory 120, so that the apparatus performs functions of the network device in the foregoing method embodiments.

The apparatus in this embodiment of this application may be configured to perform the technical solutions performed by the network device in the foregoing method embodiments. Implementation principles and technical effects thereof are similar, and details are not described herein again.

Figure 28:
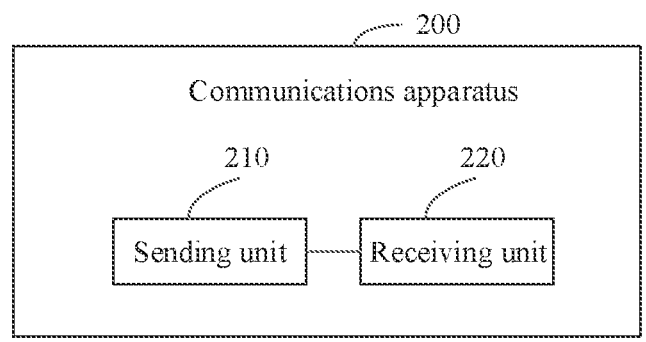
FIG. 28 is a schematic structural diagram of a communications apparatus according to Embodiment 1 of this application.

FIG. 28 is a schematic structural diagram of a communications apparatus according to Embodiment 1 of this application. The communications apparatus may be a network device, or may be a component (for example, an integrated circuit or a chip) of a network device. As shown in FIG. 28, the communications apparatus 200 may include a sending unit 210 and a receiving unit 220.

The sending unit 210 and the receiving unit 220 may implement the method on a network device side in FIG. 2, FIG. 8, FIG. 14, or FIG. 19. For example, the sending unit is configured to send indication information to a terminal device, where the indication information is used to indicate a first time-frequency resource. The receiving unit is configured to: when the first time-frequency resource overlaps with a second time-frequency resource carrying N uplink channels to be sent by the terminal device, receive at least one uplink channel carried on a time-frequency resource that is in the second time-frequency resource and that does not overlap with the first time-frequency resource from the terminal device, where N is a positive integer greater than or equal to 2.

Figure 29:
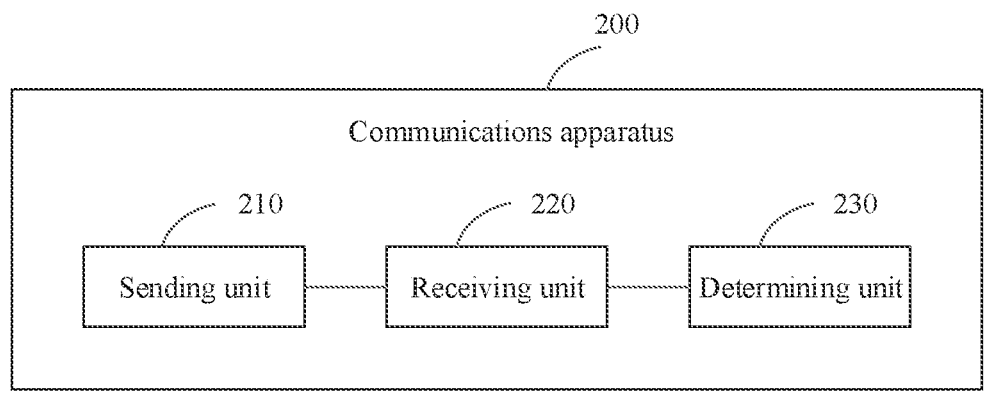
FIG. 29 is a schematic structural diagram of a communications apparatus according to Embodiment 2 of this application.

FIG. 29 is a schematic structural diagram of a communications apparatus according to Embodiment 2 of this application. Based on the foregoing embodiment, as shown in FIG. 29, the communications apparatus in this embodiment of this application further includes a determining unit 230.

The determining unit 230 is configured to: when time units carrying R uplink channels in P uplink channels belong to Q time units, and time units carrying DMRS belong to M time units, determine that the R uplink channels share the first DMRS carried in the Q time units, where R is a positive integer less than P.

The communications apparatus in this embodiment of this application may be configured to perform the technical solutions performed by the network device in the foregoing method embodiments. Implementation principles and technical effects thereof are similar, and details are not described herein again.

Figure 30:
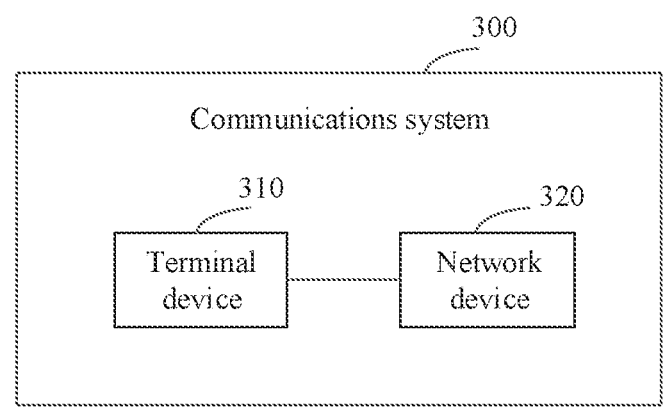
FIG. 30 is a schematic structural diagram of a communications system according to an embodiment of this application.

FIG. 30 is a schematic structural diagram of a communications system according to an embodiment of this application. As shown in FIG. 30, the communications system in this embodiment of this application includes the foregoing terminal device and network device.

The terminal device may be configured to implement functions of the terminal device in the foregoing method embodiments, and the network device may be configured to implement functions on a network device side in the foregoing method embodiments. Implementation principles and technical effects thereof are similar, and details are not described herein again.

Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In addition, mutual reference may also be made between the method embodiments and between the apparatus embodiments, and same or corresponding content in different embodiments may be cross-referenced. Details are not described herein again.

What is claimed is:

1. A communication method, applied to a communication apparatus, comprising:
    receiving indication information from a network device, wherein the indication information indicates a first time-frequency resource; and
    in a case of the first time-frequency resource overlapping K1 symbols in K consecutive symbols in a time domain and not overlapping with K2 symbols other than the K1 symbols in the K consecutive symbols in the time domain, wherein the K consecutive symbols are configured for transmitting a sounding reference signal (SRS), a sum of K1 and K2 is equal to K, and in a case of a third time interval being less than a fourth time interval:
transmitting the SRS to the network device on the K2 symbols; and
canceling SRS transmission on the K1 symbols,
wherein:
the third time interval is a time amount required by a terminal device to process the indication information, and
the fourth time interval is between a first time at which the terminal device receives the indication information and a second time at which the terminal device starts to send the SRS.

2. The method according to claim 1, wherein the SRS is repeatedly sent on symbols in one slot.

3. The method according to claim 1, wherein:
all of the K1 symbols are located in the first time-frequency resource.

4. The method according to claim 1, wherein the indication information is group-common signaling.

5. The method according to claim 1, wherein the indication information is an uplink cancelation indication.

6. The method according to claim 1, wherein:
at least one symbol of the K1 symbols is located in the first time-frequency resource, and other symbols of the K1 symbols are located outside the first time-frequency resource.

7. A communication apparatus, comprising at least one processor coupled to at least one memory, and the at least one processor is configured to execute program instructions stored in the at least one memory, to cause the communication apparatus to perform the following:
receiving indication information from a network device, wherein the indication information indicates a first time-frequency resource; and
in a case of the first time-frequency resource overlapping K1 symbols in K consecutive symbols in a time domain and not overlapping with K2 symbols other than the K1 symbols in the K consecutive symbols in the time domain, wherein the K consecutive symbols are configured for transmitting a sounding reference signal (SRS),
a sum of K1 and K2 is equal to K, and in a case of a third time interval being less than a fourth time interval:
transmitting the SRS to the network device on the K2 symbols; and
canceling SRS transmission on the K1 symbols,
wherein:
the third time interval is a time amount required by the apparatus to process the indication information, and
the fourth time interval is between a first time at which the apparatus receives the indication information and a second time at which the apparatus starts to send the SRS.

8. The apparatus according to claim 7, wherein the SRS is repeatedly sent on symbols in one slot.

9. The apparatus according to claim 7, wherein:
all of the K1 symbols are located in the first time-frequency resource.

10. The apparatus according to claim 7, wherein the indication information is group-common signaling.

11. The apparatus according to claim 7, wherein the indication information is an uplink cancelation indication.

12. The apparatus according to claim 7, wherein:
at least one symbol of the K1 symbols is located in the first time-frequency resource, and other symbols of the K1 symbols are located outside the first time-frequency resource.

13. A communication apparatus, comprising at least one processor coupled to at least one memory, and the at least one processor is configured to execute program instructions stored in the at least one memory, to cause the apparatus to perform the following:
sending indication information to a terminal device, wherein the indication information indicates a first time-frequency resource; and
in a case of the first time-frequency resource overlapping K1 symbols in K consecutive symbols in a time domain and not overlapping with K2 symbols other than the K1 symbols in the K consecutive symbols in the time domain, wherein the K consecutive symbols are configured for transmitting a sounding reference signal (SRS),
a sum of K1 and K2 is equal to K, and in a case of a third time interval being less than a fourth time interval:
receiving the SRS from the terminal device on the K2 symbols without receiving the SRS carried on the K1 symbols,
wherein:
the third time interval is a time amount required by the terminal device to process the indication information, and
the fourth time interval is between a first time at which the terminal device receives the indication information and a second time at which the terminal device starts to send the SRS.

14. The apparatus according to claim 13, wherein the SRS is repeatedly sent on symbols in one slot.

15. The apparatus according to claim 13, wherein:
all of the K1 symbols are located in the first time-frequency resource.

16. The apparatus according to claim 13, wherein the indication information is group-common signaling.

17. The apparatus according to claim 13, wherein the indication information is an uplink cancelation indication.

18. The apparatus according to claim 13, wherein:
at least one symbol of the K1 symbols is located in the first time-frequency resource, and other symbols of the K1 symbols are located outside the first time-frequency resource.

* * * * *